United States Patent
Zhang et al.

(10) Patent No.: US 11,734,855 B2
(45) Date of Patent: Aug. 22, 2023

(54) ROTATION EQUIVARIANT ORIENTATION ESTIMATION FOR OMNIDIRECTIONAL LOCALIZATION

(71) Applicant: Kabushiki Kaisha Toshiba, Tokyo (JP)

(72) Inventors: Chao Zhang, Cambridge (GB); Ignas Budvytis, Cambridge (GB); Stephan Liwicki, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 17/100,036

(22) Filed: Nov. 20, 2020

(65) Prior Publication Data
US 2022/0164986 A1    May 26, 2022

(51) Int. Cl.
*G06K 9/00*    (2022.01)
*G06T 7/77*    (2017.01)

(52) U.S. Cl.
CPC ...... *G06T 7/77* (2017.01); *G06T 2207/20081* (2013.01); *G06T 2207/20084* (2013.01)

(58) Field of Classification Search
CPC ............. G06T 7/77; G06T 2207/20081; G06T 2207/20084
USPC ....................................................... 382/103
See application file for complete search history.

(56) References Cited

U.S. PATENT DOCUMENTS

2019/0272462 A1    9/2019    Franzius et al.

FOREIGN PATENT DOCUMENTS

JP    2019-207678 A    12/2019

OTHER PUBLICATIONS

Sharma, Alisha, and Jonathan Ventura. "Unsupervised learning of depth and ego-motion from cylindrical panoramic video." 2019 IEEE International Conference on Artificial Intelligence and Virtual Reality (AIVR). IEEE, 2019. (Year: 2019).*
Hara, Takayuki, and Tatsuya Harada. "Spherical image generation from a single normal field of view image by considering scene symmetry." arXiv preprint arXiv:2001.02993 (2020). (Year: 2020).*
Behl, Aseem, et al. "Pointflownet: Learning representations for rigid motion estimation from point clouds." Proceedings of the IEEE/CVF Conference on Computer Vision and Pattern Recognition. 2019. (Year: 2019).*
Yang, Qin, et al. "Rotation equivariant graph convolutional network for spherical image classification." Proceedings of the IEEE/CVF Conference on Computer Vision and Pattern Recognition. 2020. (Year: 2020).*
Esteves, Carlos, et al. "Learning so (3) equivariant representations with spherical cnns." Proceedings of the European Conference on Computer Vision (ECCV). 2018. (Year: 2018).*

(Continued)

*Primary Examiner* — Jonathan S Lee
(74) *Attorney, Agent, or Firm* — Oblon, McClelland, Maier & Neustadt, L.L.P.

(57) ABSTRACT

A computer implemented method for pose estimation of an image sensor includes receiving an omnidirectional image of a scene captured by an image sensor; using a trained neural network to generate a rotation equivariant feature map from the omnidirectional image of the scene; and determining information relating to the pose of said camera when capturing the scene from the rotation equivariant feature map. The rotation equivariant feature map is a SO(3) indexed feature map.

20 Claims, 15 Drawing Sheets

(56) References Cited

OTHER PUBLICATIONS

Duan, Yiping, et al. "Panoramic image generation: from 2-D sketch to spherical image." IEEE Journal of Selected Topics in Signal Processing 14.1 (2020): 194-208. (Year: 2020).*
Zhang, Chao, et al. "Orientation-aware semantic segmentation on icosahedron spheres." Proceedings of the IEEE/CVF International Conference on Computer Vision. 2019. (Year: 2019).*
Cohen, Taco, et al. "Convolutional networks for spherical signals." arXiv preprint arXiv: 1709.04893 (2017). (Year: 2017).*
Cohen, Taco S., et al. "Spherical cnns." arXiv preprintarXiv:1801.10130 (2018). (Year: 2018).*
Attal, Benjamin, et al. "MatryODShka: Real-time 6DoF video view synthesis using multi-sphere images." European Conference on Computer Vision. Springer, Cham, 2020. (Year: 2020).*
Zioulis, Nikolaos, et al. "Omnidepth: Dense depth estimation for indoors spherical panoramas." Proceedings of the European Conference on Computer Vision (ECCV). 2018. (Year: 2018).*
Dadashzadeh, Amirhossein, et al. "HGR-Net: a fusion network for hand gesture segmentation and recognition." IET Computer Vision 13.8 (2019): 700-707. (Year: 2019).*

Iwan Ulrich, et al., "Appearance-Based Place Recognition for Topological Localization", IEEE International Conference on Robotics and Automation, vol. 2. Apr. 2000, pp. 1023-1029.
Alex Kendall, et al., "PoseNet: A Convolutional Network for Real-Time 6-DOF Camera Relocalization", Proceedings of the IEEE International Conference on Computer Vision, (2015), pp. 2936-2946.
Taco S. Cohen, et al., "Spherical CNNs", International Conference on Learning Representations, (2018), pp. 1-15.
Benjamin Coors, et al., "SphereNet: Learning Spherical Representations for Detection and Classification in Omnidirectional Images'", ECCV, (2016), pp. 1-16.
Chao Zhang, et al., "Rotation Equivariant Orientation Estimation for Omnidirectional Localization", httpz://mi.eng.cam ac.uk/~cipolls/publicatlons/inproceedings/2020-ACCV-Rotation-eguivariant-localisation.pdf, Oct. 5, 2020, pp. 1-18.
Chao Zhang, et al., "Rotation Equivarent Orientation Estimation for Omnidirectional Localization", #855 ACCV, Oct. 2020, 38 pages.
Office Action dated Nov. 8, 2022, in Japanese Patent Application No. 2021-041712, w/English-language Translation.

* cited by examiner (a)

(b)

(a)

(b)

(a)

(b)

(a)

(b)

(a) (b)

(c) (d)

ROTATION EQUIVARIANT ORIENTATION ESTIMATION FOR OMNIDIRECTIONAL LOCALIZATION

FIELD

Embodiments are concerned with a computer vision system and method.

BACKGROUND

Many computer vision tasks require accurately finding the position and orientation of the input camera sensor with respect to the know environment using the image alone. However, this is a challenging tasks which requires a large set of training images, spanning a huge variety of positions and orientations, making it impractical for medium or large sized environments.

DETAILED DESCRIPTION

Figure 1:
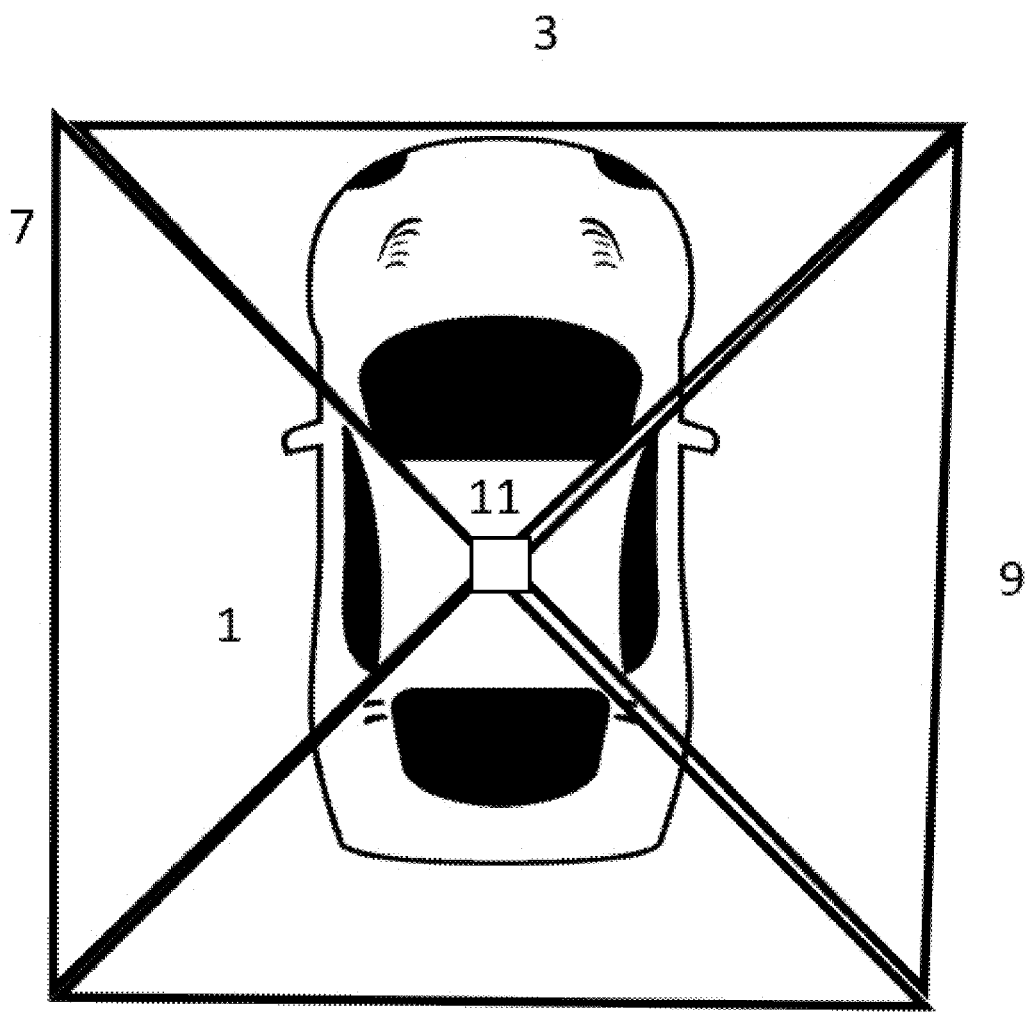
FIG. 1 is a system in accordance with an embodiment on a vehicle.
Figure 1:
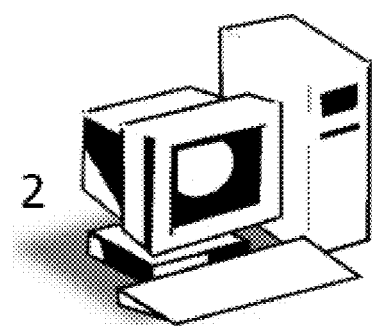

In an embodiment, a computer implemented method for pose estimation of an image sensor is provided, the method comprising:
receiving an omnidirectional image of a scene captured by an image sensor;
using a trained neural network to generate a rotation equivariant feature map from said omnidirectional image of the scene; and
determining information relating to the pose of said image sensor when capturing the scene from said rotation equivariant feature map, wherein the rotation equivariant feature map is a SO(3) indexed feature map.

The disclosed method addresses the technical problem tied to computer technology and arising in the realm of computing, namely the technical problem of estimating a pose of an imaging device in a scene. This technical problem is solves by using neural network which is configured to generate a rotation equivariant feature map, indexed in the SO(3) space, from an omnidirectional image of a scene. The improvement is provided by using a network which generates a feature map which is equivariant to any rotations of the scene, allowing for a single orientation in the scene to be used during training while, and thus achieving high training efficiency, while still achieving high accuracy in the pose estimation.

In an embodiment, the trained neural network used to generate a rotation equivariant feature map forms an encoder network and a decoder network is used to determine information relating to the pose of said image sensor when capturing the scene from said rotation equivariant feature map.

The encoder network takes the input omnidirectional image of the scene and generates the rotation equivariant feature map. The rotation equivariant feature map is provided to the decoder, which regresses the pose of the image sensor.

In an embodiment, the encoder network comprises a $S^2$ convolution layer that produces an output to a feature map that is SO(3) indexed.

The encoder is configured to receive an omnidirectional image. The omnidirectional image may be a partial-omnidirectional image. The $S^2$ convolutional layer converts the omnidirectional image from the $S^2$ spherical space to the SO(3) group space, and thus encodes the rotations in the feature map.

In an embodiment, the encoder network further comprises an SO(3) convolutional layer that is configured to receive an SO(3) indexed input, apply a convolutional filter and output an SO(3) indexed feature map.

The SO(3) convolutional layer is used for further feature extraction, while preserving the rotation equivariance properties of the network.

In a further embodiment, the encoder network comprises a plurality of SO(3) convolutional layers.

In an embodiment, the encoder network further comprising a SO(3) convolutional block, said convolutional block comprising at least one of the SO(3) convolutional layers with a residual architecture, wherein in said residual architecture, the output of the SO(3) convolutional block is a combination of the input to a SO(3) convolutional layer and the output of said convolutional SO(3) layer.

The residual connections allow for improved training efficiency as the training error is reduced and for reduced gradient degradation.

In an embodiment, the decoder network comprises an orientation decoder network being configured to determine the orientation of the image sensor.

The orientation of the image sensor is determined using the rotation equivariant property of the feature maps generated by the encoder. The orientation decoder, is configured to look for a relative change in the rotation equivariant feature map, and to determine the orientation of the camera in view of the known training orientation and the relative change in the rotation equivariant feature map.

In an embodiment, information relating to the pose is the position and/or the orientation as the method can be used to determine position on its own, pose on its own or both position and pose. In an embodiment, the decoder network comprises a position decoder network being configured to determine the position of the image sensor.

In an embodiment, the position decoder network performs regression on the feature map produced by the encoder network to determine the position of the image sensor.

In an embodiment, the position decoder network comprises an SO(3) layer configured to integrate said feature map produced by the encoder network to produce a single layer output.

The position decoder network takes the rotation equivariant feature map and produces a rotation invariant feature vector through integration. The invariant feature vector is no longer indexed in the SO(3) space and is invariant to any rotations in the scene. The position decoder may further process the invariant feature vector to regress the position of the image sensor. In an embodiment, the regression may be performed using a fully connected layer, In an embodiment, the orientation decoder network performs classification on the feature map produced by the encoder network.

The orientation decoder determines the relative change in the rotations in the rotation equivariant feature map and observes the probability distribution over all camera orientations. In an embodiment, the classification of the feature map may be performed using a softmax layer.

In an embodiment, the orientation decoder network comprises a SO(3) convolutional layer.

The SO(3) convolutional layer of the orientation decoder may be used to up-sample the rotation equivariant feature map and hence improve the accuracy of the orientation classification.

In an embodiment, the orientation decoder network outputs a probability distribution of the image sensor orientation for a plurality of defined image sensor orientations.

In a further embodiment, the plurality of defined image sensor orientations are defined in terms of Euler angles.

In an embodiment, a method of training a model to estimate the pose of an image sensor is provided, said model comprising:
an encoder network and a decoder network, said encoder network being configured to receive an omnidirectional input image and output a rotation equivariant feature map from said omnidirectional image of the scene, said decoder network comprising an orientation decoder network and a position decoder network, said orientation decoder network being configured to determine the orientation of the image sensor and the position decoder network being configured to determine the position of the image sensor,
wherein training said model comprises training said model using training data with a single image sensor orientation.

In an embodiment, a system for pose estimation of an image sensor is provided, the system comprising a processor and a memory,
wherein the processor is configured to:
receive an omnidirectional image of a scene captured by a image sensor;
retrieve a trained neural network from said memory and generate a rotation equivariant feature map from said omnidirectional image of the scene; and
determine information relating to the pose of said image sensor when capturing the scene from said rotation equivariant feature map.

In an embodiment, a vehicle comprising a localisation system is provided, said localisation system comprising a system for estimating the pose of an image sensor as recited in claim 16.

In an embodiment, a system for training a model to estimate the pose of an image sensor is provided, said system comprising a processor and a memory,
wherein said processor is configured to retrieve from memory an encoder network and a decoder network, said encoder network being configured to receive an omnidirectional input image and output a rotational equivariant feature map from said omnidirectional image of the scene, said decoder network comprising an orientation decoder network and a position decoder network, said orientation decoder network being configured to determine the orientation of the image sensor and the position decoder network being configured to determine the position of the image sensor, the processor being further configured to train said model using training data with a single image sensor orientation.

FIG. 1 illustrates a vehicle localisation system that uses an image processing method in accordance with an embodiment. The system is provided on board a vehicle so that the system travels along the vehicle.

FIG. 1 shows a schematic of a vehicle 1, wherein the vehicle 1 is equipped with a vehicle localisation system, which can for example be used in a route planning system or a static object avoidance system. The vehicle localisations system comprises omnidirectional capturing device 11, comprising of four cameras 3, 5, 7, 9, and a single central processing unit (CPU) 2. In some embodiments, the processing unit is a graphic processing unit (GPU). Camera 3 is positioned to face the direction of travel, camera 5 is positioned to face the direction opposite the direction of travel, camera 7 is positioned to face in the left direction perpendicular to the direction of travel, and camera 9 is positioned to face in the right direction perpendicular to the direction of travel. However, any arrangement can be envisaged where the combined field of view of the cameras extends at least partially around the vehicle. Each of the cameras 3, 5, 7, 9 has an extreme wide field of view of 90 degrees and are provided so that a complete 360-degree image of the surrounding of the car may be captured. In one embodiment, each camera 3, 5, 7, 9 may be provided with extreme wide-angle fisheye lens.

The single processing unit 2 is used to process the wide-angle images captured by cameras 3, 5, 7, 9.

Figure 2:
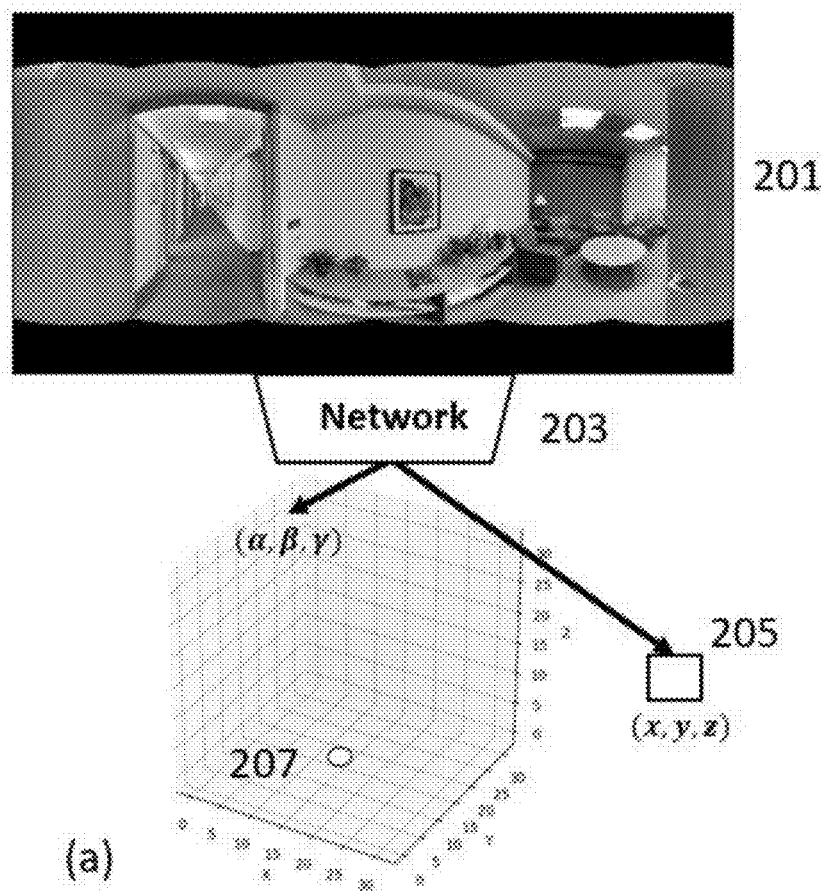
FIG. 2 is a high-level diagram of the basic steps of the method of pose estimation from an equirectangular image of a scene.
Figure 2:
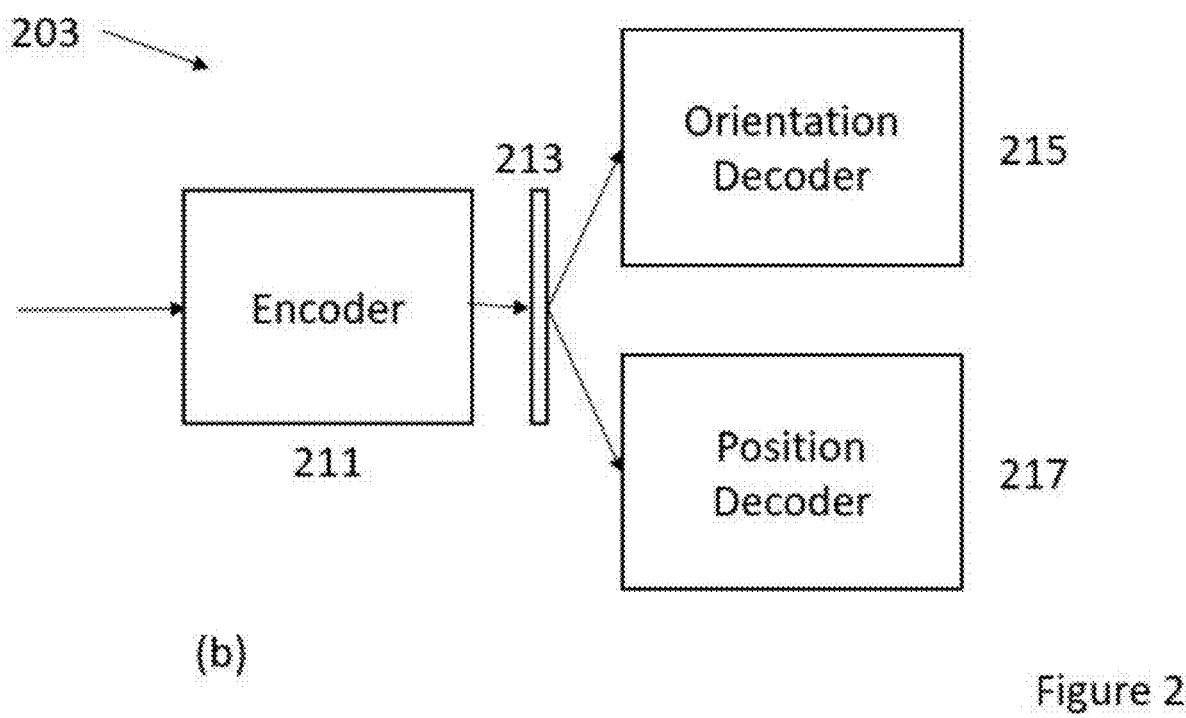

The Cameras 3, 5, 7, 9 capture images of the surrounding scene. In an embodiment, the scene is an outdoor scene, such as a city street scene, for example, or an indoor scene, such as a room or a hallway for example. The scene comprises one or more objects. The captured perspective image by cameras 3, 5, 7, 9 are mapped to panoramic sphere since they relate to a view taken around an object or scene. The images mapped to the panoramic sphere are then warped to form an equirectangular image. The omnidirectional capturing device 11 then outputs an omnidirectional image representation of the surrounding (the equirectangular image) to the vehicle localisation system, where the pose of the capturing device 11 can be estimated. The process is schematically shown in FIG. 2.

In an embodiment of the vehicle localisation system, the omnidirectional capturing device 11 may comprises a set of 3 cameras, which rotate around an axis to capture a complete or partial omnidirectional image of the surrounding environment. For example, a matterport camera may be used to obtain a plurality of perspective image from multiple view-points stitched together to form an equirectangular image of the surrounding environment. In a further embodiment, the omnidirectional capturing device may comprise one or more image sensors such as Lidar sensors, which may be used to obtain a depth image of the surrounding environment.

Pose estimation comprises estimating the position and the orientation of the capturing device 11, here and after referred to as the camera, in a known environment relative to a coordinate system. This information can subsequently be used in the route planning of a vehicle and in the control and/or the positioning of the vehicle such that a objects, present in the surrounding scene, are avoided.

While the embodiments described above relate to a system for localisation of a vehicle such as a car, a drone or a robot, it should also be understood that the described systems can be applied to any other system for image alignment, for example, comparing two instances for the purposes of change detection. The described system can also be used to provide localisation information to a customer in an environment such as an airport or a station, for example, where the customer may use their handheld device to obtain a full 360 or a partial 360 panorama of the surrounding environment.

FIG. 2 shows a high-level diagram of the basic steps of the method of pose estimation from an equirectangular image of a scene.

An equirectangular image is obtained using the camera 11, as described above in relation to FIG. 1. Alternatively or additionally, the equirectangular image can be obtained from a remote omnidirectional capturing device, and communicated to the CPU 2, where it is provided as input to a Convolutional Neural Network (CNN), denoted a "network" in the FIG. 2(a). In an embodiment, the image provided to the input of the convolutional neural network may be a spherical or partially spherical omnidirectional image, or any other image which may be rotationally modified without any generalisation losses caused by rotating the pixels of the image along a common axis. The equirectangular image 201 is processed by the CNN 203, which outputs the positon of the camera 11. In an embodiment, the positions is expressed as x, y, z components of a known coordinate system, and its orientation, where the orientation is expressed in terms of XYZ Euler angles. The XYZ Euler angles may relate to azimuth $\alpha \in [-\pi, \pi]$, elevation $$\beta \in [-\frac{\pi}{2}, \frac{\pi}{2}],$$

and roll $\gamma \in [-\pi, \pi]$.

In the FIG. 2(a) it is shown that the network comprises two separate outputs, and thus that the orientation and the position are output separately by the network 203. The first output, shown in the Figure as a square 205, is the positon of the camera 11 expressed as x, y, z coordinates, and the second output, shown as a dot 207, is the orientation of the camera 11, expressed in terms of XYZ Euler angles. The network 203 will now be described in more detail in relation to FIG. 2(b).

In an embodiment of the currently proposed convolutional neural network for vehicle localisation, the convolutional neural network comprises an encoder 211 and a decoder. The Encoder encodes the input equirectangular image 201 to a latent space 213. The latent space 213 is provided as input to the decoder. The decoder has two branches, a first branch 215 and a second branch 217 as shown in FIG. 2(b).

Figure 3:
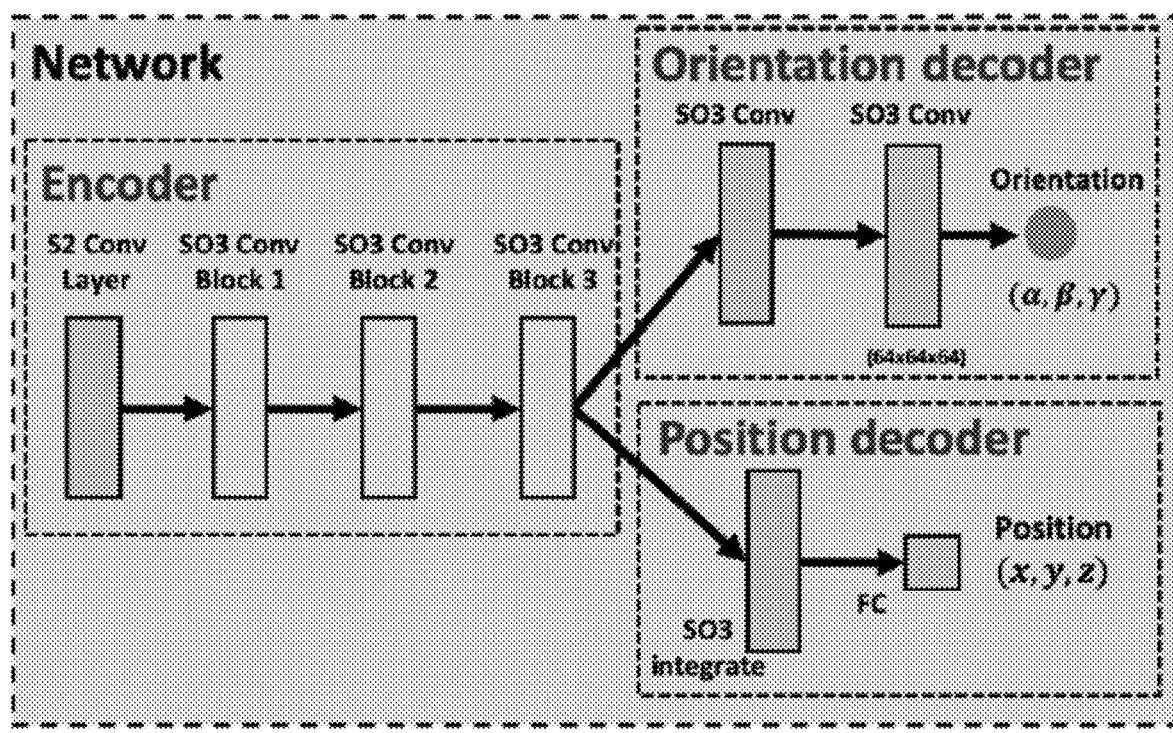
FIG. 3 is a high-level diagram of a network for positon regression and orientation classification.
Figure 3:
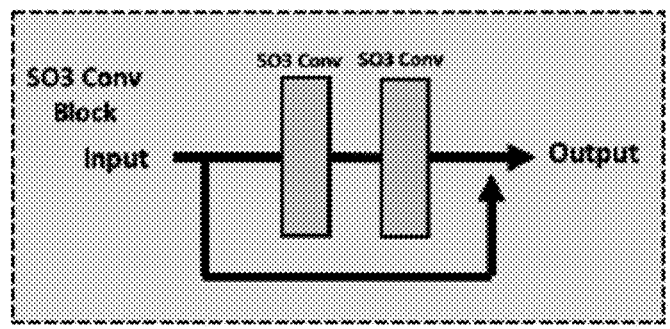

FIG. 3 shows a high-level diagram of a convolutional neural network which can be used to determine the position and orientation of the camera in accordance with an embodiment. In the Figure, the encoder and each of the two branches of the decoder is outlined in a dashed rectangle, whereas the network blocks and layers are presented in solid-line rectangles. As it will be discussed below with reference to FIG. 3(b), the network blocks comprise a plurality of layer.

The encoder is a rotation equivariant spherical encoder, in FIG. 3(a). In an embodiment, an equirectangular image is provided as input to the rotation equivariant spherical encoder, which processes the image to produce a rotation equivariant feature response. In the Figure, the rotation equivariant spherical encoder branches out into two parallel branches and the rotation equivariant feature response is provided as input to both the first and the second parallel branch. The first parallel branch is the rotation invariant decoder, also referred to as the 'Position decoder', which is used for positon regression, and the second parallel branch is the equivariant orientation classifier, also referred to as the 'Orientation decoder', which is used for orientation prediction.

The rotation equivariant spherical encoder receives the input equirectangular image and performs rotationally equivariant feature extraction, and thus generating the rotation equivariant feature response. The rotation equivariant feature response can subsequently be converted to a rotation invariant form which can be used for robust prediction of the camera position, where the position is invariant to any orientation of the camera. Furthermore, the rotation equivariance of the encoder allows a single orientation of the scene to be observed during training of the network. Thus, at test time, a relative shift in the rotation equivariant feature response, in view of the orientation at train time, is observed and the orientation of the camera is recovered from the shift of the peak in probability distribution of camera orientations. The use of a rotation equivariant convolutional neural network alleviates the need for orientation augmentation at train time while supporting any SO(3) rotation in orientation at test time. Thus the proposed network achieves improved training efficiency and estimation accuracy. The proposed network also achieves parameter efficiency as parameters can be shared across rotations and no parameter relearning is required for each rotation.

The architecture of the rotation equivariant spherical encoder will now be described in relation to FIGS. 3(a) and (b). The rotation equivariant spherical encoder comprises a $S^2$ Conv layer followed by three residual SO(3) Conv blocks, as shown in FIG. 3(a).

The $S^2$ Conv layer is applied to the input equirectangular image to create an output represented by a 3D cube, a rotation equivariant feature response where the feature response is indexed using the XYZ-Euler angles representation of rotations. The rotation equivariant feature response is then passed through the residual SO(3) Conv blocks where further features are extracted. The output of the encoder, the rotation equivariant feature response, is subsequently used by the two parallel branches to estimate the orientation and the position of the camera, respectively.

The $S^2$ Conv convolution corresponds to a convolution of a 2D pattern with a 2D surface on the spherical manifold, where the spherical manifold is shifted using SO(3) rotations, analogous to filter translations in standard convolution operations on planar images. Since the output shifts with input orientation changes, rotation equivariance is achieved, similar to translation equivariance in standard CNNs.

The unit sphere $S^2$ is a two-dimensional manifold, parameterised by spherical coordinates $\alpha \in [-\pi, \pi]$ and $$\beta \in \left[-\frac{\pi}{2}, \frac{\pi}{2}\right],$$

and can be defined as a set of points $x \in \mathbb{R}^3$ with norm 1, where x is a 3D unit vector. Both the input spherical images and filters are modelled as continues functions. The spherical images are modelled as $f: S^2 \rightarrow \mathbb{R}^K$, where K is the number of channels. The spherical filters are modelled as $\varphi: S^2 \rightarrow \mathbb{R}^K$, where K is the number of channels.

The value of the output feature map evaluated at a rotation $R \in SO(3)$ is computed as an inner product between the input feature map, or the image, and a filter, rotated by R. The rotations R is presented as a 3×3 matrices which preserves distance ($\|Rx\|=\|x\|$) and orientation (det(R)=+1). The rotation of the point on the sphere can be performed using the matrix-vector product Rx.

To rotate filters on the sphere, a rotation operator $L_R$ is used. The rotation operator takes a function $f(x)$ and generates a rotated function $L_R f(x)$ by composing $f(x)$ with rotation $R^{-1}$, such that:

$$[L_R f](\chi) = f(R^{-1}\chi) \tag{1}$$

Thus the correlations of two spherical signals $f$ and $\varphi$ in the $S^2$ space, for any rotation $R \in SO(3)$, is shown by equation 2. From equation 2, it follows that the output, as a function of $R \in SO(3)$, is also a function in the SO(3) space.

$$[\psi \star f](R) = \langle L_R \psi, f \rangle = \int_{S^2} \sum_{k=1}^{K} \psi_k(R^{-1}x) f_k(x) dx. \tag{2}$$

In Equation 2, the integration measure dx denotes the standard rotation invariant integration measure on the sphere, which may be expresses as $d\alpha \sin(\beta) d\beta/4\pi$, for example. The invariance of the measure ensures that for any rotation $R \in SO(3)$, Equation 3 is satisfied.

$$\int_{S^2} f(R\chi) d\chi = \int_{S^2} f(\chi) d\chi \tag{3}$$

Similarly, the rotation group SO(3) correlation between two spherical signals can be expressed as in Equation 5. The rotation group SO(3) is a three-dimensional manifold which can be expressed in terms of XYZ-Euler angles $\alpha \in [-\pi, \pi]$, elevation $$\beta \in \left[-\frac{\pi}{2}, \frac{\pi}{2}\right],$$

and roll $\gamma \in [-\pi, \pi]$. Here the spherical input $f$ and the spherical filters $\varphi$ are matrixes in the SO(3) space and are modelled as a $f, \varphi: SO(3) \rightarrow \mathbb{R}^K$, where the K is the number of channels. The rotation operator $L_R$ is also generalised so that it can be used with signals in the SO(3) space. The generalised rotation operator $L_R$ takes a function $f(Q)$ and generates a rotated function $L_R f(Q)$ by composing f(Q) with rotation $R^{-1}$, as shown in equation 4, where both R, $Q \in SO(3)$.

$$[L_R f](Q) = f(R^{-1}Q) \tag{4}$$

Thus the rotation group correlation of two spherical signals $f$ and $\varphi$ in the SO(3) space for any rotation $R \in SO(3)$, is shown by Equation 5. The inputs $f$ and $\varphi$ are in the SO(3) space ($f, \varphi \in SO(3)$), and from the Equation it can be seen that the output is a function of R and therefore is also in the SO(3) space. In Equation 5, the integration measure dQ is the invariant measure in the SO(3) space, which may be expressed in the ZYZ-Euler angles as $d\alpha \sin(\beta) d\beta d\gamma/(8\pi^2)$, for example. The invariance of the measure ensures that for any rotation $R \in SO(3)$, is satisfied, Equation 6.

$$[\psi \star f](R) = \langle L_R \psi, f \rangle = \int_{SO(3)} \sum_{k=1}^{K} \psi_k(R^{-1}Q) f_k(Q) dQ \tag{5}$$

$$\int_{SO(3)} f(RQ) dQ = \int_{SO(3)} f(Q) dQ \tag{6}$$

Following equations 2 and 5, the correlation between two spherical signals in both $S^2$ and SO(3) space is defined in terms of the unitary rotation operator $L_R$. The rotation operator can be used through a set of operations and hence through the layers of the network because of the equivariant property of all convolution and correlation operations.

Taken the number of channels K=1, then $S^2$ correlation operation of Equation 2 and the SO(3) correlation operation of Equation 5 can be shown to be equivariant:

$$[\varphi \star [L_Q f]](R) = \langle L_R \varphi, L_Q f \rangle = \langle L_{Q^{-1}R}\varphi, f \rangle = [\varphi \star f](Q^{-1}R) = [L_Q[\varphi \star f]](R) \tag{7}$$

Referring back to FIG. 3, the $S^2$ Conv layer is provided with the equirectangular image of a scene, it computes the correlation of the input equirectangular image with the spherical filters in the $S^2$ space with rotation R, and produces an output feature map in the rotation group SO(3) space. Thus, an input in the $S^2$ space is converted to a SO(3) space. The $S^2$ Conv layer performs rotation equivariant convolutional operation and thus the output of the $S^2$ Conv layer is shifted according to any rotational change in orientation of the input.

The output of the $S^2$ Conv layer is then processed by three residual SO(3)Conv blocks. As shown in FIG. 3(b), each residual SO(3)Conv block may comprise two SO(3)Conv layers, and a skip connection is used to add the input feature maps of the first SO(3)Conv layer to the output feature maps of the second SO(3)Conv layer. The residual architecture of the SO(3)Conv blocks allows for reduced training errors and for more efficient learning of features due to the reduced gradient degradation.

Figure 4:
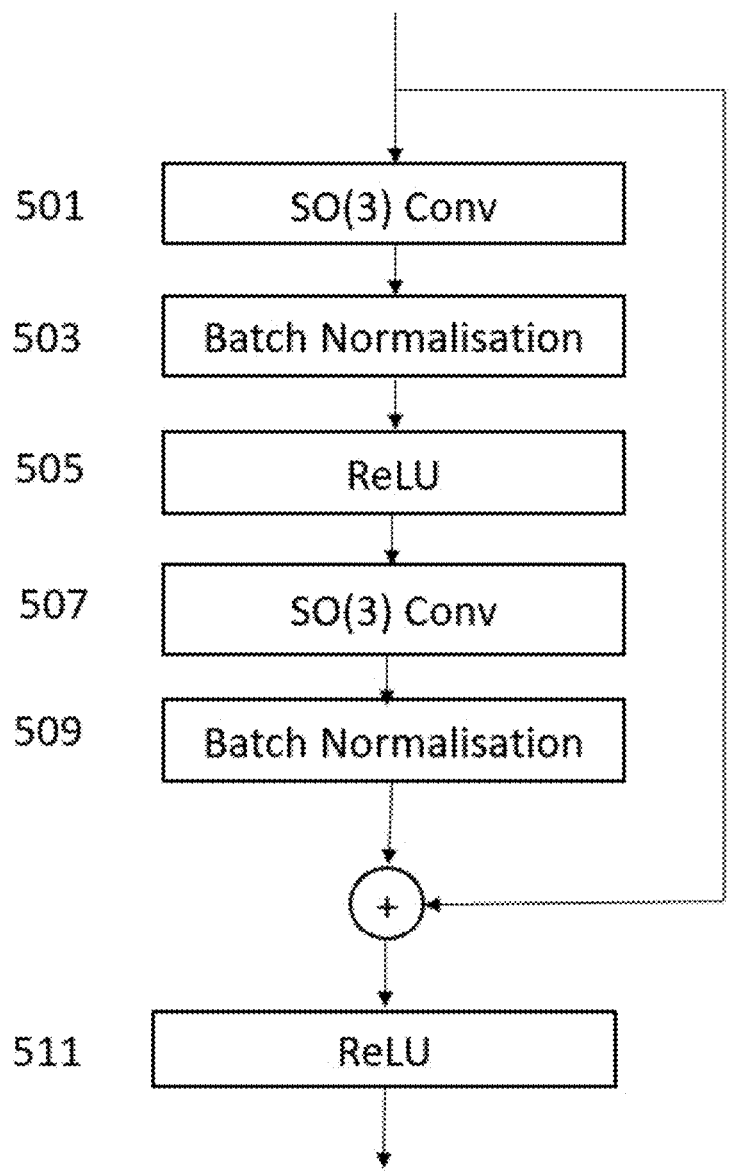
FIG. 4 is a diagram of the architecture of a SO(3)Conv block, in accordance with an embodiment.

FIG. 4 provides a more detailed architecture of the SO(3)Conv blocks, in accordance with an embodiment. The first SO(3) Conv layer 501, receives the output of the previous layer, where the output is a 4-dimensional rotation equivariant feature map, encoded in the SO(3) space, and performs a convolution with filters encoded in the SO(3) space.

The first SO(3)Conv layer may perform subsampling operation using convolution with stride 2 and effectively reduces the spatial dimensions of the feature maps with a factor of 2. The feature maps output by the first SO(3)Conv layer 501 is passed through a batch normalisation layer 503, and a ReLU activation layer 505, before the feature maps are processed by the second SO(3)Conv layer 507. In an embodiment, in an SO(3)Conv block, the second SO(3) Conv layer comprises the same number of filters as the first SO(3)Conv layer 507 but does not perform subsampling operation, i.e. the second SO(3)Conv layer 507 perform convolution operation with stride 1.

In layer 509, batch normalisation is applied to the output of the second SO(3)Conv layer 507, before the input of the SO(3)Conv block is added to the output of the batch normalisation layer 509. In the final layer of the SO(3)Conv block, a ReLU activation function 511 is applied.

In an embodiment, the encoder is provided with an input image with spatial dimensions of 64×64 px, discretised on a Driscoll-Healy [J. R. Driscoll and D. M. Healy. Computing Fourier transforms and convolutions on the 2-sphere. Advances in applied mathematics, 1994.] grid with bandwidth of 32, and comprising 3 channels—one for each red, blue, and green colour.

The input image with spatial dimensions of 64×64 px, bandwidth 32 and 3 feature channels is passed through the $S^2$ Conv layer. The $S^2$ Conv layer outputs 32 feature maps, each feature map being a 3D-cube feature map having spatial dimensions of 32×32×32 and bandwidth of 16. The feature maps, output by the $S^2$Conv block, are passed through the first SO(3) Conv block. The first SO(3) Conv block outputs 64 feature maps, each feature map being a 3D-cube feature map having spatial dimensions of 16×16×16 and bandwidth of 8.

The feature maps, output by the first SO(3) block, are passed through the second SO(3) Conv block. The second SO(3) Conv block outputs 128 feature maps, each feature map being a 3D-cube feature map having spatial dimensions of 16×16×16 and bandwidth of 8.

Finally, the feature maps, output by the second SO(3) block, are passed through the third SO(3) Conv block. The third SO(3) Conv block outputs 128 feature maps, each feature map being a 3D-cube feature map having spatial dimensions of 16×16×16 and bandwidth of 8. Thus, the encoder 211 outputs rotational equivariant feature response comprising 128 feature maps, each feature map being a 3D-cube map having spatial dimensions of 16×16×16 and bandwidth of 8. Each 3D-cube map comprises the rotations in the SO(3) space.

At the end of the encoder, the convolutional neural network used for positon regression and orientation classification, in accordance with an embodiment, branches out into two parallel branches. The first branch is the orientation decoder and the second branch is the position decoder. The rotation equivariant feature response, output by the encoder, is provided as input to both the first and the second parallel branch.

As discussed above, the $S^2$Conv and the SO(3)Conv are equivariant and preserve the orientation information, and the generated by the encoder rotation equivariant feature response varies according to the rotation in the input image. The equivariant property of the network is used by the orientation decoder to determine the orientation of the camera at test time. The orientation of the camera at test time is estimated by determining the relative shift in the orientation in the SO(3) cube of XYZ Euler angles i.e. the rotation equivariant feature response output by the encoder. At train time, the network is trained with image dataset, where all images in the training dataset comprise the same orientation. During training of the network, a particular cell of the SO(3) cube, representing the rotation equivariant feature response, is classified for the fixed orientation at training. At test time, the classification peak follows the rotations within the SO(3) cube. Thus, orientation of the camera is determined using the relative change in the rotation equivariant feature response and the known orientation at training time.

The architecture of the orientation decoder, in accordance with an embodiment, is schematically shown in FIG. 3(a). The orientation decoder comprised two SO(3) layers followed by a softmax activation layer with cross entropy loss, not shown in the Figure.

In the rotation equivariant feature response, the number of the possible rotations is quantised by the resolution of the feature maps in the rotation equivariant feature response, i.e. the quantisation in the XYZ-Euler angle cube, thus there is a trade-off between the rotation accuracy and the efficiency. As the output of the encoder is characterised with dimensions of 128×16×16×16, the first SO(3) Conv convolution layer is aimed to up-sample the output resolution of the feature maps to resolution of 32×32×32×32. In the classification task is used the second SO(3)Conv layer of the orientation decoder, which is a single channel SO(3)Conv layer outputting a feature map with dimensions of 1×64×64×64, and the softmax layer which outputs the probability distribution over the camera orientations. The camera orientation is recovered from the relative shift of the peak in the probability distribution of the output of the softmax layer.

Figure 5:
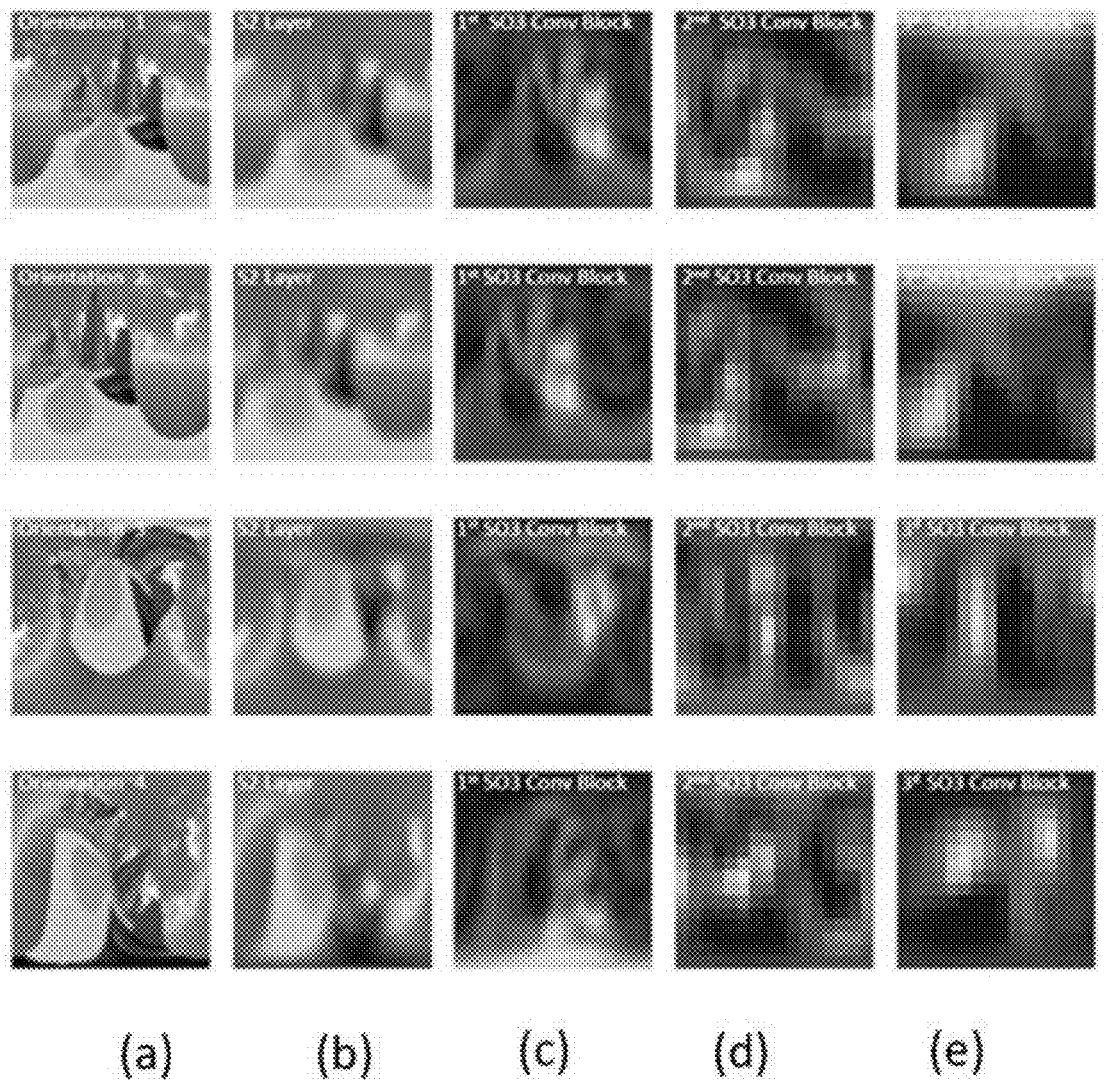
FIG. 5 is a graphical comparison of input images at different stages of the network, in accordance with an embodiment.

FIG. 5 shows input images with different orientations, and corresponding feature maps of the rotation equivariant feature response obtained at different layers of the encoder of FIG. 3. Column (a) shows the input image of an outdoor scene in four different orientations; column (b) shows a corresponding feature map of the rotation equivariant feature response of the $S^2$ Conv layer of the encoder; column (c) shows a corresponding feature map of the rotation equivariant feature response of the first SO(3) Conv layer of the encoder; column (d) shows a corresponding feature map of the rotation equivariant feature response of the second SO(3) Conv layer of the encoder; column (e) shows a corresponding feature map of the rotation equivariant feature response of the third SO(3) Conv layer of the encoder;

In FIG. 5, it can be seen that with each subsequent SO(3)Conv block of the encoder, the feature maps become more abstract and capturing higher level features. It can also be seen how the feature map responses follow the change in the input image camera orientation. As the input image is rotated along azimuth α and elevation β, the feature response rotates accordingly.

Referring to FIG. 3 again, the rotation equivariant feature response of the encoder is also provided as input of the position decoder, which is used for invariant regression of the 3D camera position, expressed as $(x,y,z) \in \mathbb{R}^3$. The position decoder uses the rotation equivariant feature response to produce a rotation invariant prediction of the camera position.

In an embodiment, the position decoder comprises an SO(3) integration layer, which performs integration of the rotation equivariant feature response over the SO(3) rotation group space to produce a rotation invariant feature vector. Effectively, the SO(3) integration layer, computes a summed values i.e. rotations of each 16×16×16×16 3D-cube feature map in the rotational equivariant feature response. Thus, the output of the SO(3) integration layer is a 128-feature vector. The SO(3) integration layer is followed by a fully connected layer, which is used to regress a position vector in $\mathbb{R}^3$.

The feature vector, output by the SO(3) integration layer, is fully rotation invariant feature vector. After the SO(3) integration layer, the rotations encoded in the rotational equivariant feature response are no longer recoverable due to the summation operation performed by the integration operation and hence the feature vector is fully rotationally invariant. The use of a rotation invariant feature vector significantly reduced the learning requirements for the network. In an embodiment, the rotation invariant feature vector comprises 128 values.

The rotation invariant position vector, generated by the SO(3) integration layer, is provided to the input of the fully connected layer, which performs the final position regression. The fully connected layer does not need to learn responses related to rotations, as rotations are invariant.

Figure 6:
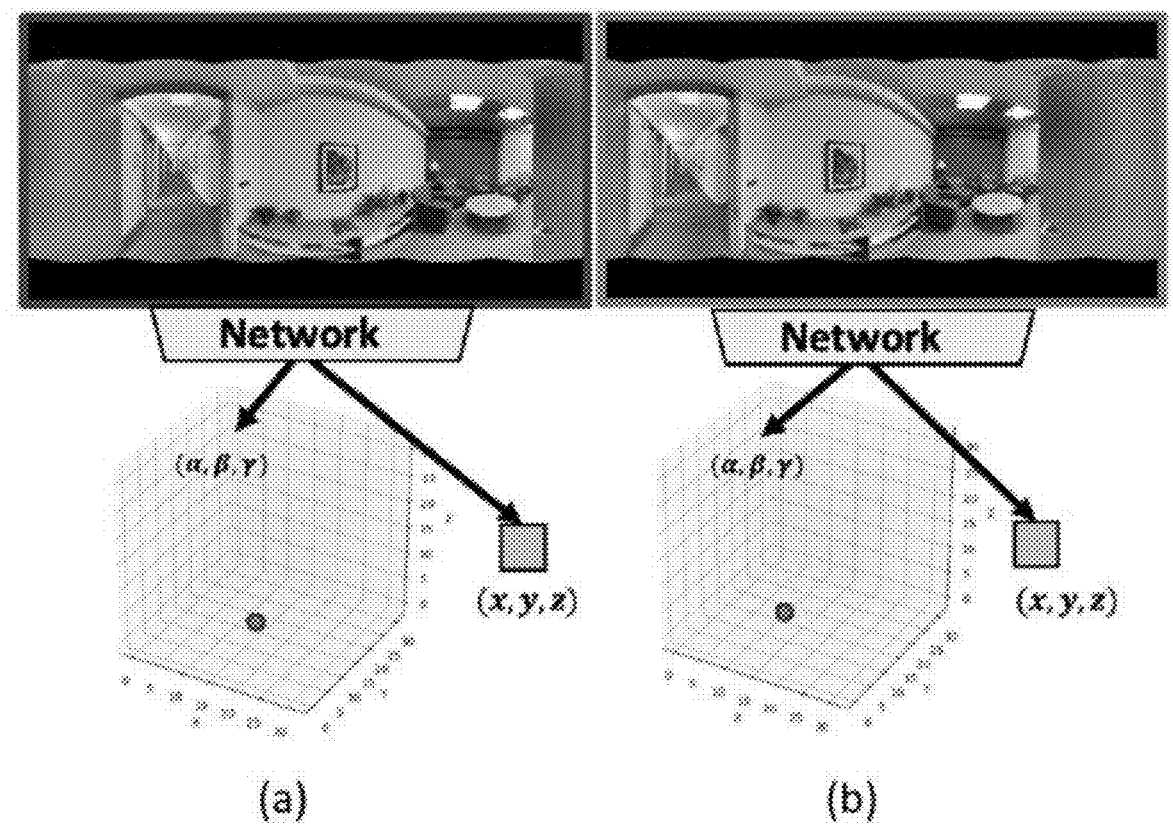
FIG. 6 is a graphical comparison of the change in the network output in relation to a change in the orientation of the input images.
Figure 6:
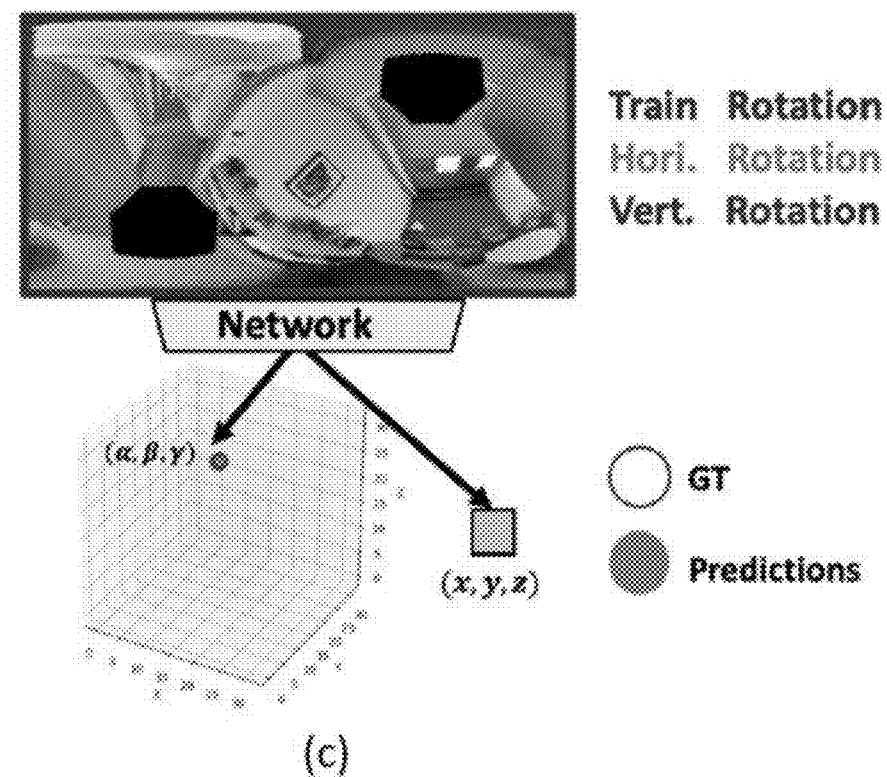

FIG. 6 schematically shows how the output of the network changes with a change in the orientation of the camera. FIG. 6(a) shows the training image and the training orientation is shown as a dot on the XYZ-Euler coordinate system. The position of the camera is shown as a square and it can be seen that the position of the camera is constant for all of the three input images. In FIG. 6(b), the camera is slightly rotated in horizontal direction and it can be seen that the change in orientation prediction is also reflected on the coordinate system, as a slight change in the x-component is observed. In FIG. 6(c), the camera is rotated in vertical direction, and the corresponding change in the orientation of the camera is also reflected on the coordinate system, as a change in the z-component is observed.

The training and the evaluation of the proposed network for pose estimation from an equirectangular image of a scene is performed using two datasets—SceneCity [Zhang, Z., Rebecq, H., Forster, C., Scaramuzza, D.: Benet of large field-of-view cameras for visual odometry. In: 2016 IEEE International Conference on Robotics and Automation (ICRA), IEEE (2016) 801-808] and custom dataset based on the Stanford 2D3DS [Armeni, I., Sax, S., Zamir, A. R., Savarese, S.: Joint 2d-3d-semantic data for indoor scene understanding. arXiv preprint arXiv:1702.01105 (2017)]. The datasets will now be described in more detail.

Figure 9:
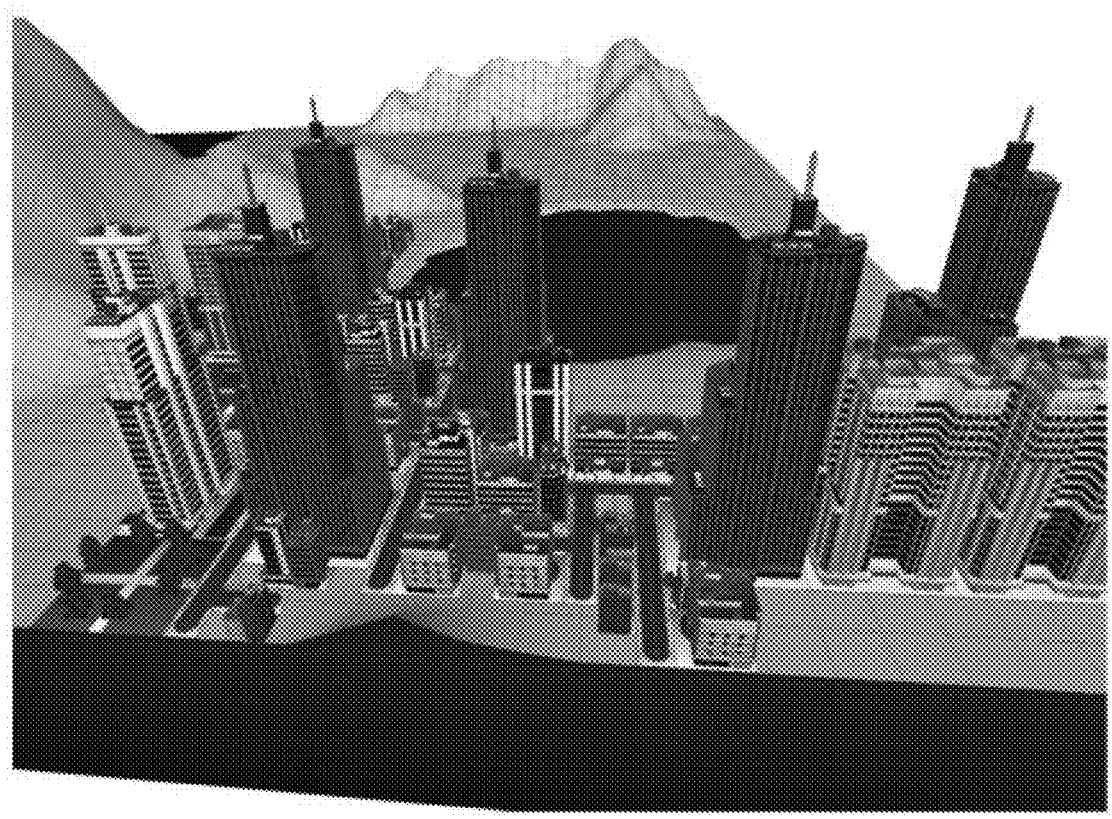
FIG. 9 is a snapshot of the SceneCity Small model.

The SceneCity dataset contains equirectangular images rendered from one big artificially generated city and one small artificially generated city. The small city environment contains 102 buildings and 156 road segments. A snapshot of the complete SceneCity small model is shown in FIG. 9. Additionally, the SceneCity dataset provides a 3D-textured mesh which can be used to render additional images with desired camera position and orientation.

Figure 7:
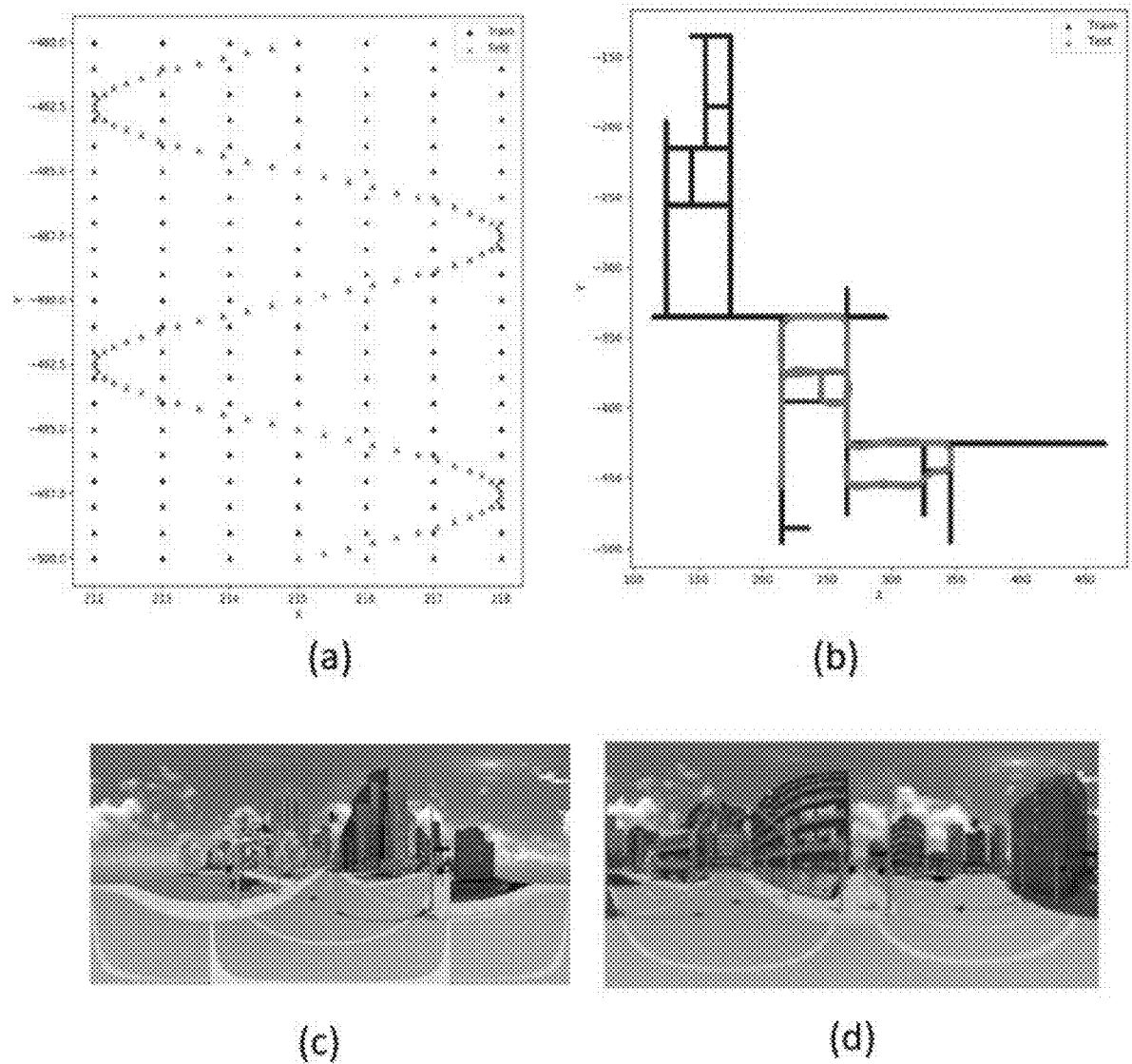
FIG. 7 is a graphical representation of the SceneCity dataset.

In the evaluation process, described further below in this description, small street segment (6 meters×20 meters) of the map of the small SceneCity dataset is taken and 147 training images and 100 testing images are rendered. The rendered dataset, training and testing images, is denoted as SceneCity Grid and is shown in FIGS. 7(a) and 7(c). FIG. 7(a) shows a plot of the train locations, denoted as black triangles, and the test locations, denoted as grey triangles. In the Figure, the train and test locations are plotted onto the XY coordinate system of the selected small street segment. It can be seen on the FIG. 7(a) the training images are densely sampled with equal spacing between one another, while the test images are sampled along a sinusoidal curve. FIG. 7(c) shows an equirectangular image of the rendered SceneCity Grid dataset.

In the evaluation process, the original SceneCity Small, consisting of 1146 training locations and 300 test locations, is also used. FIG. 7(b) shows a plot of the training locations as black triangles, and the test locations as grey triangles. In the Figure, the train and test locations are plotted onto XY the coordinate system of the selected small street segment. As the locations are in close proximity to one another, they appear as a continuous red lines. FIG. 7(d) shows an equirectangular image of the original SceneCity Small dataset.

Figure 8:
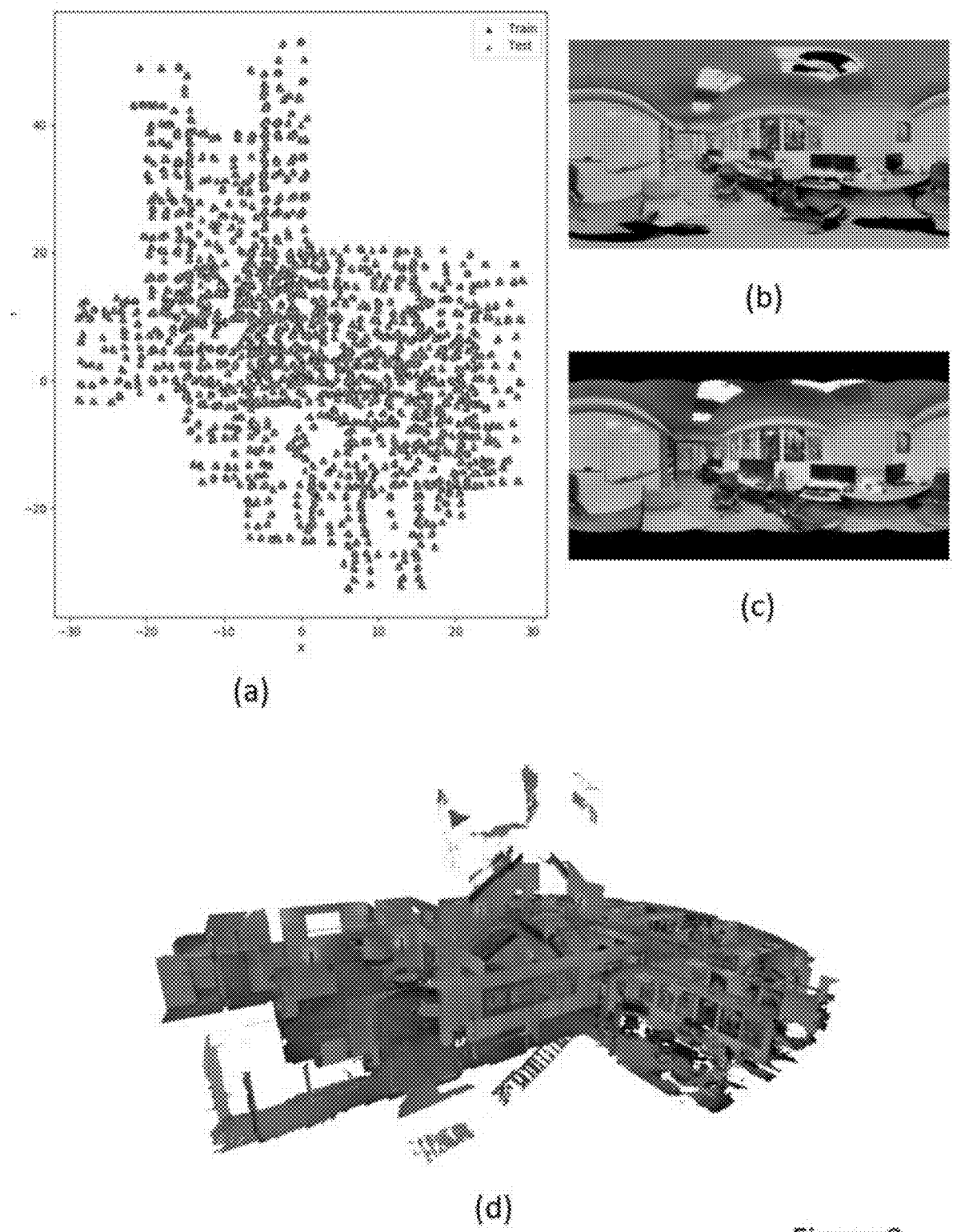
FIG. 8 is a graphical representation of a custom Stanford 2D3DS dataset.

The custom dataset based on the Stanford 2D3DS dataset consists of 7065 synthetically rendered train images and 1413 test images, both synthetically rendered and real scenes. The dataset covers six areas of approximately 6000 m$^2$. The dataset is also accompanied by 3D-point clouds, shown in FIG. 8(a), with textures and ground truth camera poses of the provided images, FIGS. 8(b) and 8(c). FIG. 8(d) shows a 3D mesh of the custom Stanford 2D3DS dataset.

Using the custom Stanford 2D3DS dataset, the effectiveness of the proposed network is evaluated using two scenarios. In both cases, the network is trained using the synthetically rendered images of the custom Stanford 2D3DS dataset, and the two scenarios defer only in the testing stage. The first scenario involves testing the network on synthetically rendered images, and the second scenario involves testing the network on the images captures of real scenes, the second scenario being more challenging than the first scenario due to the discrepancy gap between synthetic-to-real images. In particular, as test data are used all 1413 real images of the custom Stanford 2D3DS dataset as well as all their synthetically rendered counterparts. For training data, 7065 synthetically rendered images are generated, where the training images are rendered with random origins within a radius of 30 centimetres around the test location.

Furthermore, during training aggressive non-geometric augmentation techniques, such as Colour and Gamma Augmentations, Gaussian blur, additive Gaussian noise, cropping and masking augmentation, may be used on the synthetically rendered train images of the custom Stanford 2D3DS dataset in order to improve the localisation performance on real images and to reduce the domain gap between synthetically rendered images and real images. It is also understood that the augmentation techniques may also be used in the experiments performed on the SceneCity Small and SceneCity Grid dataset.

Colour Augmentation may be used to adjust the brightness, contrast, saturation and hue of an image in a random order. For example, the scalar factor for brightness may be set to 0.4, the scalar factor for contrast may be set to 0.4, the scaling factor for saturation may be set to 0.4, and the scaling factor for hue may be set to 0.1.

Gamma Augmentation performs gamma correction of an image. The gamma augmentation is also known as the Power Law transform, and any gamma value larger than 1 makes the shadows darker, while gamma values smaller than 1 make darker regions brighter. The gamma may be uniformly chosen in the interval between 0.5 and 2.0, for example.

Gaussian Blur Augmentation randomly blurs the image using a Gaussian kernel with standard derivation uniformly sampled in the interval 0 to 0.5, for example. The Gaussian blur augmentation may be randomly enabled for 50% of the training images.

Gaussian Noise Augmentation randomly adds pixel-wise noise to an image. In an embodiment, the noise sampled from a Gaussian distribution with zero mean and standard deviation in the interval 0 to 12.75. The Gaussian Noise augmentation is randomly enabled for 50% of the training images.

Cropping Augmentation crops an image using a rectangular bounding box. For example, for an input image of 128×256, the height and width of the box is uniformly sampled in the pixel interval [60, 120] and [160, 240], respectively. The bounding box may also be randomly rotated in the SO(3) space. The cropping augmentation aims at reducing the overfitting via structured drop-out. The augmentation may be randomly enabled for 20% of the training data images, for example. In an embodiment, the cropping augmentation is performed on input image before they are resized to fit the input image size requirements of the network.

Masking Augmentation. For training, synthetically rendered images may be produced using Blender and the images are artefacts-free. However, for testing, the real images from the 2D3DS have black artefacts at the top and bottom. To reduce the effect of artefacts, the top and the bottom of an image is randomly masked to zero values. The mask size may be uniformly selected in the pixel interval [0, 10] for input of 64×64, for example. Masking augmentation" aims at better matching the artefacts visible in real testing data. In an embodiment, the masking augmentation is randomly enabled for 50% of the training images, and is applied on the already resized images.

Figure 15:
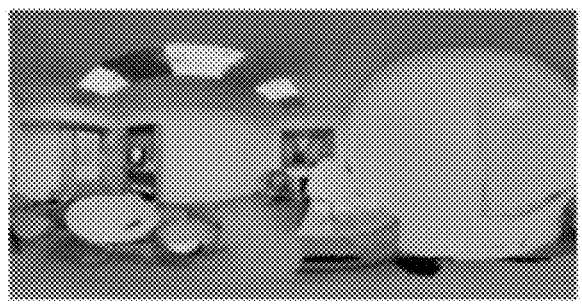
FIG. 15 is a graphical comparison of image augmentation techniques.
Figure 15:
Figure 15:
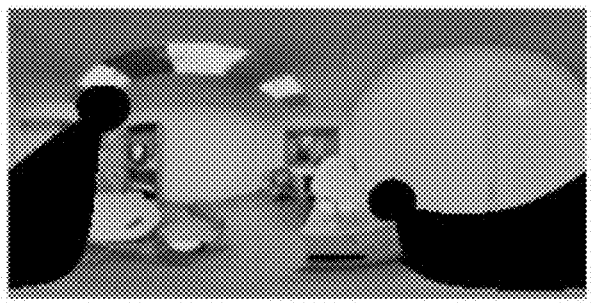
Figure 15:

FIG. 15 shows the effect of data augmentation. The Figure shows a synthetically rendered image (a) and a real image (b) taken with the same camera pose from the custom Stanford 2D3DS dataset. The difference in terms of the brightness and the contrast between the two images is prominent. Cropping augmentation is applied in (c) to introduce structured drop-out. Black artefacts are present at the top and the bottom of the real image in (b). In (d) masking augmentation of random size is applied on the synthetic image. In (d) only one random size is shown.

For most of the experiments, the training of the proposed network is performed using equirectangular images which are resized to 64×64 pixels, where all equirectangular images have the same fixed orientation in the global mesh. This is achieved without loss of generalisation, since the input images are omni-directional images, and the camera orientation can be adjusted with minimal loss. The training process of the network will not be described in relation to FIG. 10.

Figure 10:
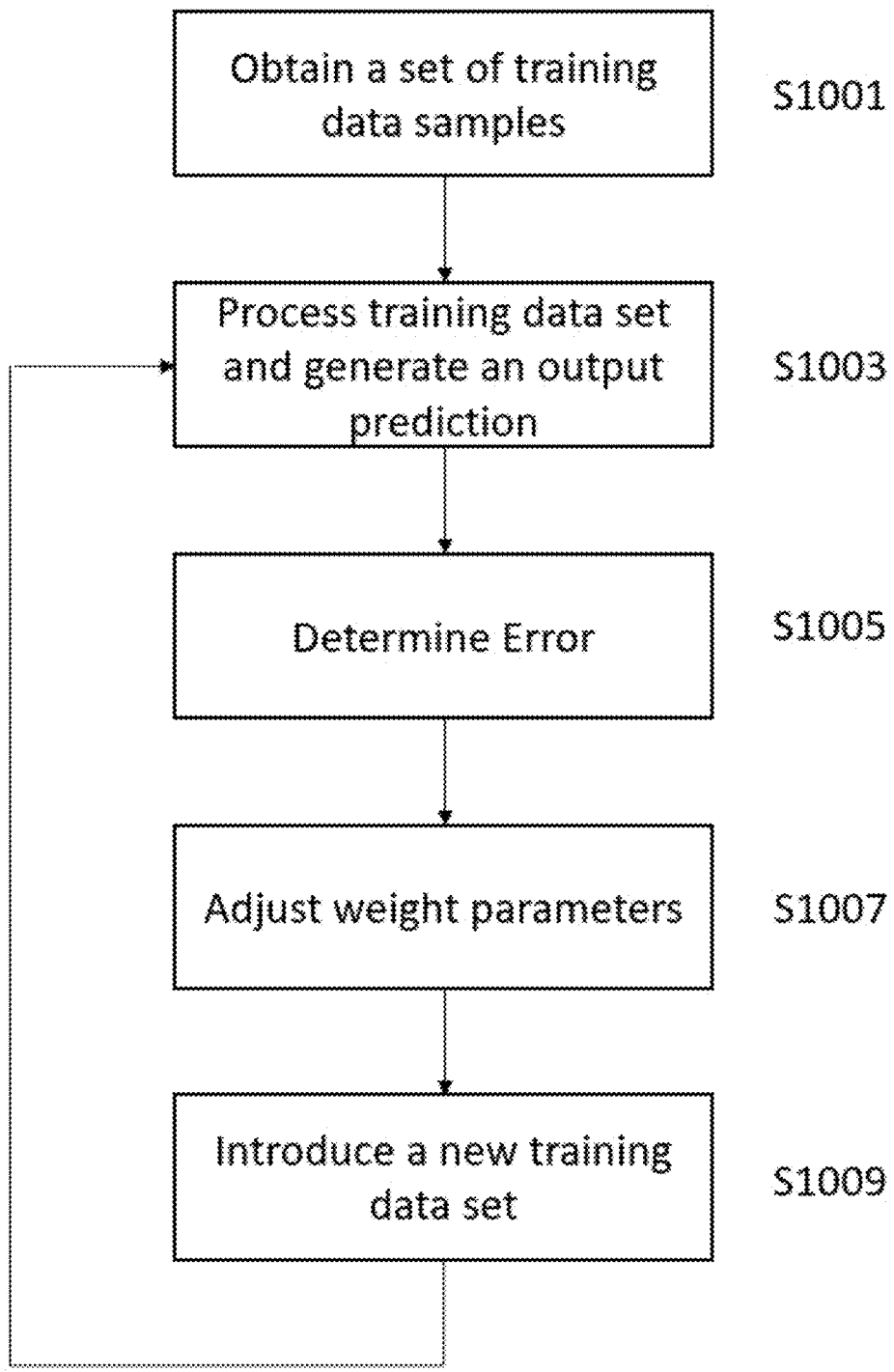
FIG. 10 is a flow-diagram of an example process for training a neural network.

FIG. 10 illustrates a flowchart of an example process for training a neural network for pose estimation from an equirectangular image of a scene. The neural network aca be trained by processing many samples of training data and, for every sample, adjusting the weight of each parameter in accordance with the error between the output generated by the neural network and a target output specified in the training sample. Once trained, the neural network can be deployed in a system, for example the neural network system of FIG. 1. The training procedure can be carried out by one or more computers.

In Step S1001, the raining system obtains a set of training data. Each data set comprises a training equirectangular image of a scene and a target pose of the camera. The training target output of the training data sets represents the desired output which should be generated by the neural network. The target output is compared with the actual output of the neural network and the weighting parameters are adjusted so that the error between the target output and the generated output is reduced. In Step S1003, the neural network processes the input equirectangular image using the current values of the internal parameters and generates and output prediction of the pose.

squared loss is used for training of the positon regression. No pre-training of the network is performed.

The performance of the method is evaluated based on average (avg) and median (med) Euclidean distance on position and angular divergence, and the results of three experiments are presented. The first experiment is performed on the SceneCity Grid dataset, the second experiment is on two large synthetic datasets: the SceneCity Small and the custom Stanford-2D3DS, and the third experiment is on real data.

The first experiment investigates how rotation augmentation, orientation decoder resolution and PCA Whitening affect the performance of the method. This experiment is based on the SceneCity Grid dataset, which, as described above, consists of densely sampled training and testing locations in order to provide optical data for pose regression, and hence the performance of the network will not suffer from any interpolation or extrapolation issues.

Table 1 shows how geometric training augmentation based on rotations affects the performance of the network. In particular, it is investigated the testing on images from new positions but with original training rotations, horizontally rotated (rotations around the y-axis, and randomly rotated by any SO(3) rotation. The proposed method demonstrates good position and orientation predictions in all scenarios achieving below 0.2 m (meters) position error with about 5° (degrees) orientation error. These results are achieved even for the most challenging scenario of training the network with a single orientation while using any orientation at testing. The method successfully generalises one training orientation to arbitrary test orientations.

TABLE 1

| Method | Aug. Type | Epochs | Original Rot. | | | | Rand. y-axis Rot. | | | | Random SO(3) | | | |
|---|---|---|---|---|---|---|---|---|---|---|---|---|---|---|
| | | | Pos.(m) | | Rot.(°) | | Pos.(m) | | Rot.(°) | | Pos.(m) | | Rot.(°) | |
| | | | avg | med | avg | med | avg | med | avg | med | avg | med | avg | med |
| Ours($64^3$) | none | 3k | 0.11 | 0.09 | 4.20 | 4.20 | 0.12 | 0.10 | 4.20 | 4.20 | 0.17 | 0.16 | 5.05 | 5.05 |
| | SO(3) | 3k | 0.22 | 0.17 | 2.54 | 2.51 | 0.19 | 0.17 | 4.21 | 4.20 | 0.19 | 0.16 | 2.54 | 2.32 |

In Step S1005, the predicted output of the neural network is compared with the target output and the error in the prediction is estimated. Consecutively, in Step S1007, the weight of each internal parameter is adjusted so that the error between the predicted output and the target output is reduced to minimum.

In Step S1009, the network is provided with a different set of training data and the training returns to step S1003 in order to repeat the training procedure and adjust the internal parameters of the neural network so that a smaller error in the predicted output and the target output is achieved.

The convolutional neural network of the two branches of the decoder are trained together. However, in an embodiment, the convolutional neural network of the position decoder may be trained separately from the convolutional neural network of the orientation decoder.

The proposed network is implemented in PyTorch [Paszke, A., Gross, S., Massa, F., Lerer, A., Bradbury, J., Chanan, G., Killeen, T., Lin, Z., Gimelshein, N., Antiga, L., et al.: Pytorch: An imperative style, high-performance deep learning library. In: Advances in neural information processing systems. (2019) 8026-8037]. The network is trained with batch size 20 and up to 3000 epochs. Adam optimiser with polynomial learning rate scheduler with initial learning rate of $10^{-4}$ is used, as well as an l2-norm for position regression loss and cross entropy loss for orientation prediction. The positon loss is weighted at ×100, as it is found that the rotation task converges faster than the orientation task. Mean Table 2 shows the performance of the proposed network when different resolutions is used for the orientation decoder. The orientation decoder is parameterised by the size of the rotation equivariant feature response output by the encoder stage of the network.

Thus, the orientation predictions are inherently quantised. The performance of the network is therefore evaluated with rotation equivariant feature response with dimensions of $32^3$, $64^3$ and $128^3$. In Table 2, the varying orientation decoder resolution is shown in parentheses. From the results in Table 2 it can be concluded that higher resolution improves the orientation accuracy at the expense of slightly reduced position accuracy: 13.2° error with 0.18 meters for $32^3$, 5.05° error with 0.17m error for $64^3$, and 2.78° error with 0.31 m error fro $128^3$. With the increased resolution, the difficulty of the classification task is increased, and thus the capacity for improved position is reduced. The use of the full rotation augmentation at training reduces the effect of quantisation, from 5.05° to 2.54° error at $64^3$, Table 1, but at the cost of training efficiency.

TABLE 2

| Method | Aug. Type | Epochs | Original Rot. | | | | Rand. y-axis Rot. | | | | Random SO(3) | | | |
| | | | Pos.(m) | | Rot.(°) | | Pos.(m) | | Rot.(°) | | Pos.(m) | | Rot.(°) | |
| --- | --- | --- | --- | --- | --- | --- | --- | --- | --- | --- | --- | --- | --- | --- |
| | | | avg | med | avg | med | avg | med | avg | med | avg | med | avg | med |
| Ours($32^3$) | none | 3k | 0.12 | 0.11 | 8.34 | 8.34 | 0.15 | 0.14 | 13.4 | 14.0 | 0.18 | 0.17 | 13.2 | 13.6 |
| Ours($64^3$) | none | 3k | 0.11 | 0.09 | 4.20 | 4.20 | 0.12 | 0.10 | 4.20 | 4.20 | 0.17 | 0.16 | 5.05 | 5.05 |
| Ours($128^3$) | none | 3k | 0.15 | 0.15 | 2.10 | 2.10 | 0.22 | 0.21 | 3.12 | 3.18 | 0.31 | 0.28 | 2.78 | 3.02 |

Principle Components Analysis (PCA) Whitening may be used to normalise the ground truth (GT) coordinates. The effect of PCA whitening is shown in Table 3. PCA whitening of position coordinates improves the position prediction from 0.37 m, without PCA whitening, to 0.17 m, with PCA whitening, error at $64^3$. In Table 3, 'Ours*' denotes the implementation of the network without PCA whitening. PCA whitening normalises the position coordinates to a common range. This helps the general position task, as input values are consistent across training datasets even if training coordinates vary largely in scales for different datasets, and makes training of the network easier.

TABLE 3

| Method | Aug. Type | Epochs | Original Rot. | | | | Rand. y-axis Rot. | | | | Random SO(3) | | | |
| | | | Pos.(m) | | Rot.(°) | | Pos.(m) | | Rot.(°) | | Pos.(m) | | Rot.(°) | |
| --- | --- | --- | --- | --- | --- | --- | --- | --- | --- | --- | --- | --- | --- |
| | | | avg | med | avg | med | avg | med | avg | med | avg | med | avg | med |
| Ours($64^3$) | none | 3k | 0.11 | 0.09 | 4.20 | 4.20 | 0.12 | 0.10 | 4.20 | 4.20 | 0.17 | 0.16 | 5.05 | 5.05 |
| Ours*($64^3$) | none | 3k | 0.16 | 0.17 | 4.20 | 4.20 | 0.36 | 0.31 | 4.69 | 4.90 | 0.37 | 0.31 | 4.73 | 5.14 |

In the second experiment is evaluated the performance of the proposed network on two large environments: the SceneCity Small and the custom Stanford-2D3DS.

Figure 11:
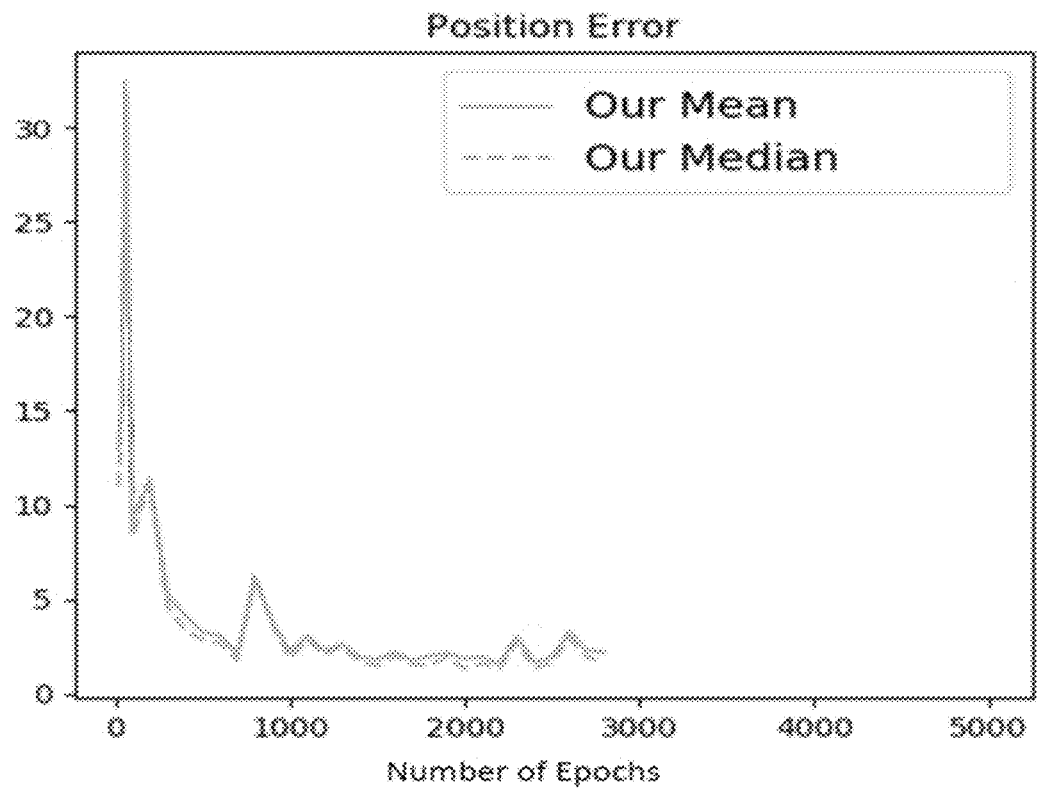
FIG. 11 is a plot of error over evaluated epochs.
Figure 11:
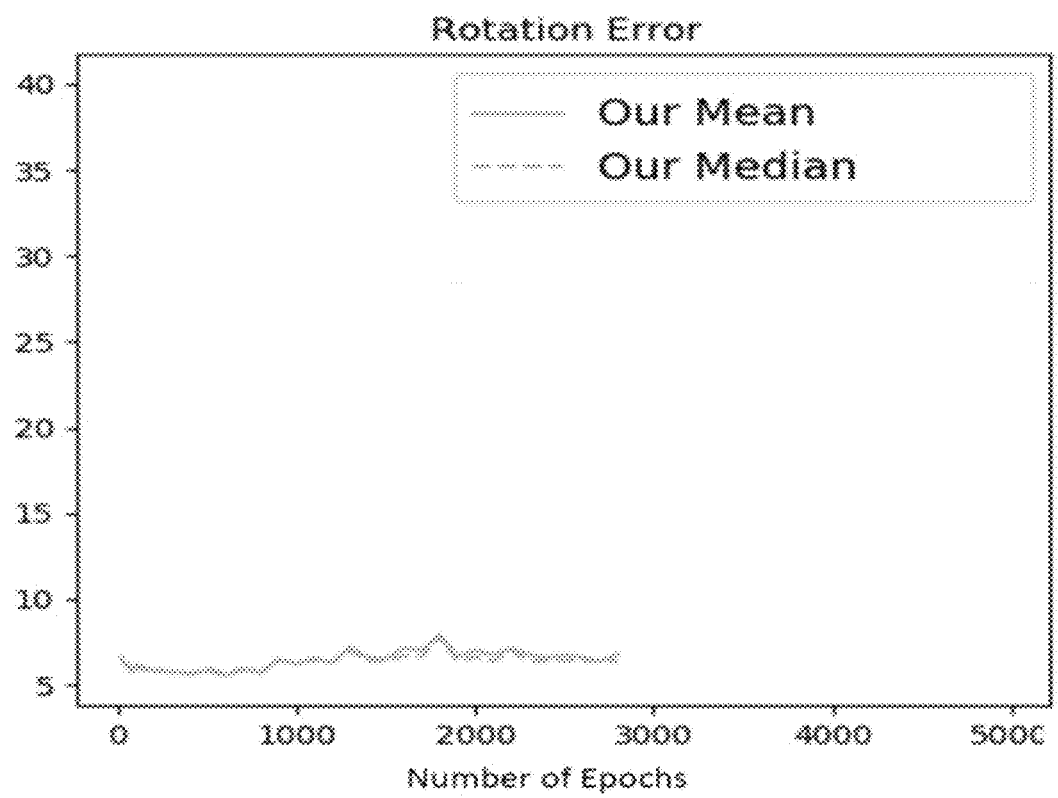

Similarly to the first experiment, the images in the SceneCity Small dataset are adjusted to have fixed camera orientation for all training poses. Thus, the network is trained using a single training rotation. During test, both images with original orientation and with random orientation are used. The position and orientation errors over the evaluated epochs are shown in FIGS. 11(a) and 11(b) respectively. The network achieves high performance (less than 2 m) within 2000 epochs, while rotation error of less than 10° is reached after less than 600 epochs, close to theoretical limit due to the quantisation of about 5° It is also seen that the orientation decoder with cross-entropy loss converges especially fast. The proposed network achieves 2.22 m error for position, and 9.41° error for orientation, Table 4.

TABLE 4

| Method | Aug. Type | Pos. | | Rot. | |
| --- | --- | --- | --- | --- | --- |
| | | avg | med | avg | med |
| Ours | none | 2.22 | 1.71 | 9.41 | 9.13 |

Table 5 shows the quantitative results on the custom Stanford 2D3DS dataset. The set of columns on the left side of the Table contain the testing results on synthetic images, while the columns on the right side of the Table contain the testing results on real images. It is emphasized that the proposed network is limited by the classification quantisation in the orientation decoder as output resolution of $64^3$ is used.

Figure 12:
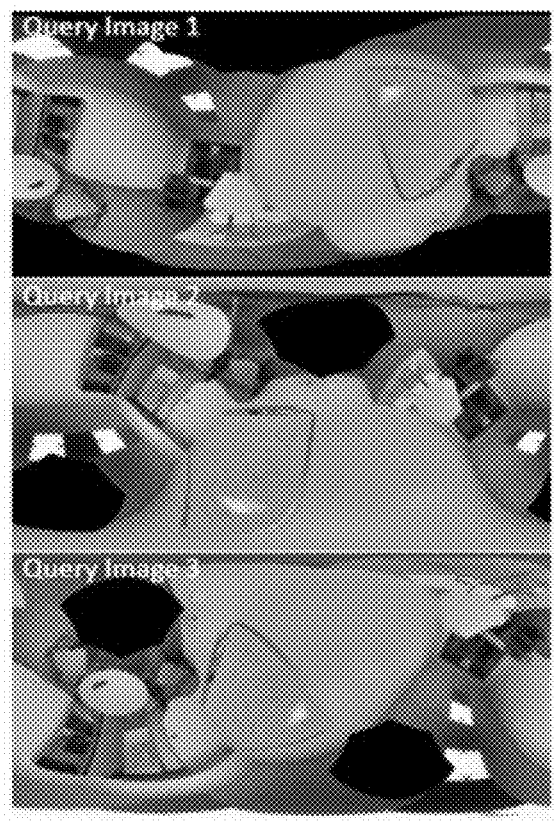
FIG. 12 is a visualization of results on the custom Stanford 2D3DS dataset.
Figure 12:

FIG. 12 shows qualitative results of the network on the custom Stanford 2D3DS dataset. FIG. 12(a) shows the query images from the custom Stanford 2D3DS dataset under arbitrary orientations and corresponding camera pose predictions are shown in FIG. 12(b). In light grey is shown the ground truths, while the corresponding camera pose predictions are shown in dark grey.

TABLE 5

| | | Synthetic Images | | | | | | | Real Images | | | | | | | |
|---|---|---|---|---|---|---|---|---|---|---|---|---|---|---|---|---|
| | | Orig. Rotation | | | | Rand. Rotation | | | | Orig. | | | | Rand. Rotation | | |
| | | Pos. | | Rot. | | Pos. | | Rot. | | Pos. | | Rot. | | Pos. | | Rot. |
| Method | Aug Type | avg | med | avg | med | avg | med | avg | med | avg | med | avg | med | avg | med | avg | med |
| Ours | none | 0.98 | 0.84 | 10.9 | 8.47 | 1.79 | 1.54 | 13.3 | 12.6 | 3.07 | 1.64 | 18.2 | 9.15 | 3.57 | 2.45 | 25.6 | 13.1 |

In the third experiment, the performance of the network is evaluates on the real image test set of the custom Stanford 2D3DS. In this experiment, training is again perform on synthetically rendered images using Blender as explained above, and no rotation augmentation is performed during training. At test time are used both images with original orientation and images with random orientations. The results are shown in the right columns of Table 5.

Figure 13:
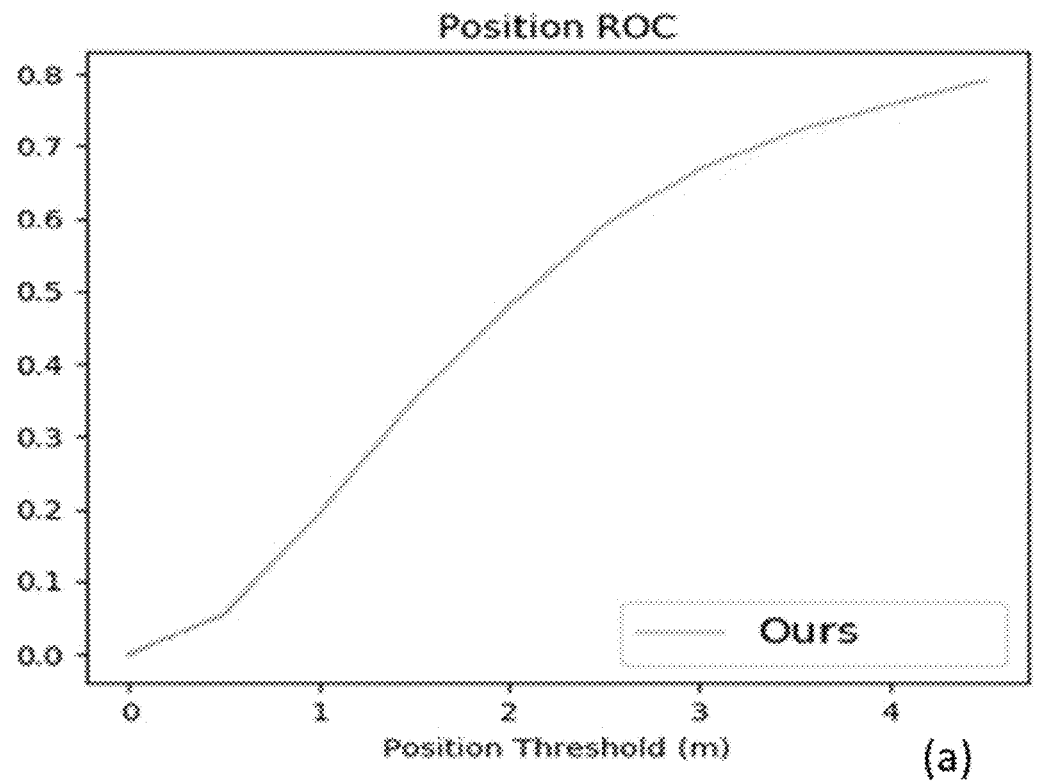
FIG. 13 is a visualization of receiver operating characteristic curves.
Figure 13:
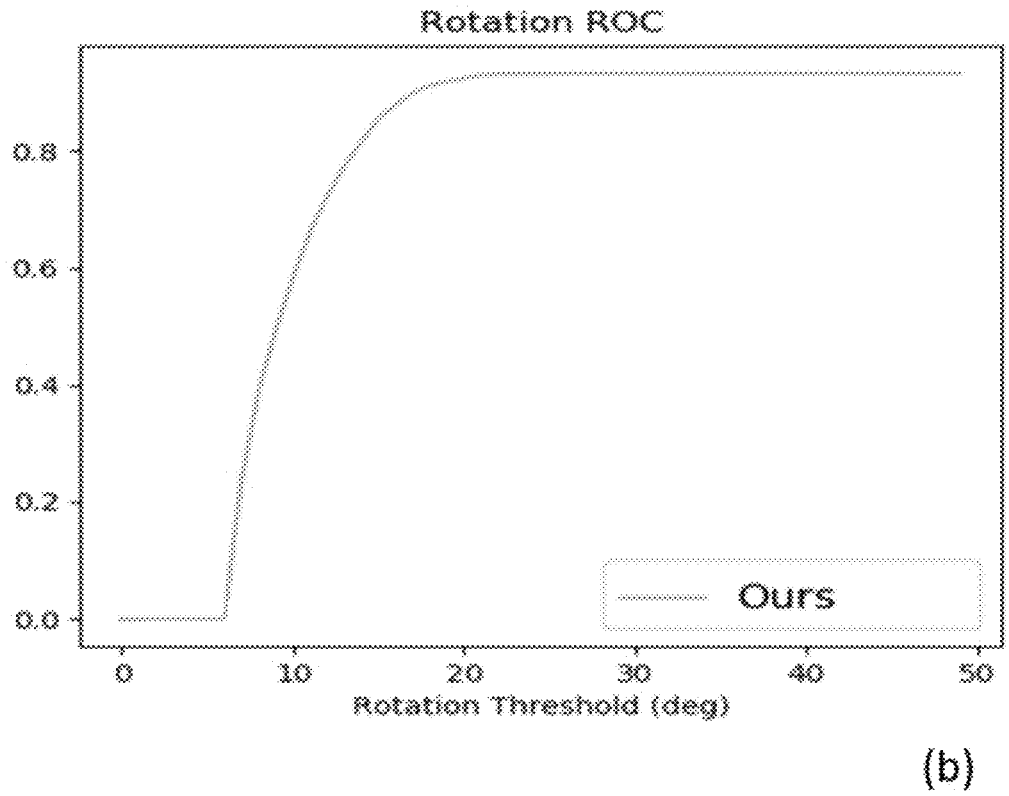

FIG. 13 shows the receiver operating characteristic (ROS) curves for positon, FIG. 13(a) and orientation, FIG. 13(b). The curve indicates the percentage of test images within a specific position error threshold or orientation error threshold. The results are generated by testing on real images with original camera location and rotations. The network achieves 80% orientations predicted within 15°, and more than 50% of the orientations are predicted within 10° error.

Figure 14:
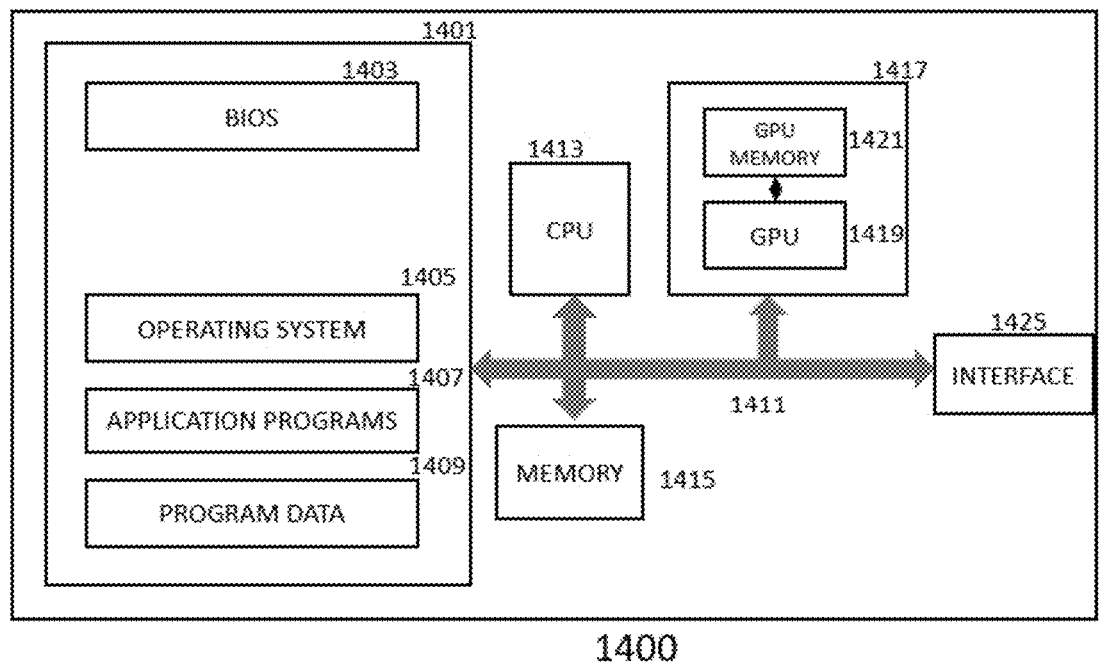
FIG. 14 is a schematic of a system in accordance with an embodiment.

FIG. 14 is a schematic of the hardware that can be used to implement methods in accordance with embodiments. It should be noted that this is just one example and other arrangements can be used.

The hardware comprises a computing section 1400. In this particular example, the components of this section will be described together. However, it will be appreciated they are not necessarily co-located.

Components of the computing system 1400 may include, but not limited to, a processing unit 1413 (such as central processing unit, CPU), a system memory 1401, a system bus 1411 that couples various system components including the system memory 1401 to the processing unit 1413. The system bus 1411 may be any of several types of bus structure including a memory bus or memory controller, a peripheral bus and a local bus using any of a variety of bus architecture etc. The computing section 1400 also includes external memory 1415 connected to the bus 1411.

The system memory 1401 includes computer storage media in the form of volatile/or non-volatile memory such as read-only memory. A basic input output system (BIOS) 1403 containing the routines that help transfer information between the elements within the computer, such as during start-up is typically stored in system memory 1401. In addition, the system memory contains the operating system 1405, application programs 1407 and program data 1409 that are in use by the CPU 1413.

Also, interface 1425 is connected to the bus 1411. The interface may be a network interface for the computer system to receive information from further devices. The interface may also be a user interface that allows a user to respond to certain commands et cetera.

Graphics processing unit (GPU) 1419 is particularly well suited to the above described method due to the operation of this multiple parallel calls. Therefore, in an embodiment, the processing may be divided between CPU 1413 and GPU 1419.

The above described architecture also lends itself to mobile telephones using GPUs. Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A computer implemented method for pose estimation of an image sensor, the method comprising:
   receiving an omnidirectional image of a scene captured by an image sensor;
   using a trained neural network to generate a rotation equivariant feature map from said omnidirectional image of the scene; and
   determining information relating to the pose of said image sensor when capturing the scene from said rotation equivariant feature map,
   wherein the rotation equivariant feature map is a SO(3) indexed feature map.

2. The method according to claim 1, wherein the trained neural network used to generate a rotation equivariant feature map forms an encoder network and a decoder network is used to determine information relating to the pose of said image sensor when capturing the scene from said rotation equivariant feature map.

3. The method according to claim 2, wherein the encoder network comprises a $S^2$ convolution layer that produces an output to a feature map that is SO(3) indexed.

4. The method according to claim 3, wherein the encoder network further comprises an SO(3) convolutional layer that is configured to receive an SO(3) indexed input, apply a convolutional filter and output an SO(3) indexed feature map.

5. The method according to claim 4, wherein the encoder network comprises a plurality of SO(3) convolutional layers.

6. The method according to claim 4, wherein the encoder network comprising a SO(3) convolutional block, said convolutional block comprising at least one of the SO(3) convolutional layers with a residual architecture, wherein in said residual architecture, the output of the SO(3) convolutional block is a combination of the input to a SO(3) convolutional layer and the output of said convolutional SO(3) layer.

7. The method according to claim 2, wherein the decoder network comprises an orientation decoder network being configured to determine the orientation of the image sensor.

8. The method according to claim 7, wherein the orientation decoder network performs classification on the feature map produced by the encoder network.

9. The method according to claim 8, wherein the orientation decoder network comprises a SO(3) convolutional layer.

10. The method according to claim 8, wherein the orientation decoder network outputs a probability distribution of the image sensor orientation for a plurality of defined image sensor orientations.

11. The method according to claim 10, wherein the plurality of defined image sensor orientations are defined in terms of Euler angles.

12. The method according to claim 2, wherein the decoder network comprises a position decoder network being configured to determine the position of the image sensor.

13. The method according to claim 12, wherein the position decoder network performs regression on the feature map produced by the encoder network to determine the position of the image sensor.

14. The method according to claim 13, wherein the position decoder network comprises an SO(3) layer configured to integrate said feature map produced by the encoder network to produce a single layer output.

15. A non-transitory computer-readable medium comprising instructions which, when executed by a computer, cause the computer to carry out the method of claim 1.

16. A method of training a model to estimate the pose of an image sensor, said model comprising:
an encoder network and a decoder network, said encoder network being configured to receive an omnidirectional input image and output a rotation equivariant feature map from said omnidirectional image of a scene, said decoder network comprising an orientation decoder network and a position decoder network, said orientation decoder network being configured to determine the orientation of the image sensor and the position decoder network being configured to determine the position of the image sensor,
wherein training said model comprises training said model using training data with a single image sensor orientation.

17. A non-transitory computer-readable medium comprising instructions which, when executed by a computer, cause the computer to carry out the method of claim 16.

18. A system for pose estimation of an image sensor, the system comprising a processor and a memory,
wherein the processor is configured to:
receive an omnidirectional image of a scene captured by an image sensor;
retrieve a trained neural network from said memory and generate a rotation equivariant feature map from said omnidirectional image of the scene; and
determine information relating to the pose of said image sensor when capturing the scene from said rotation equivariant feature map.

19. A vehicle comprising a localisation system, said localisation system comprising a system for estimating the pose of an image sensor as recited in claim 18.

20. A system for training a model to estimate the pose of an image sensor, said system comprising a processor and a memory,
wherein said processor is configured to retrieve from memory an encoder network and a decoder network, said encoder network being configured to receive an omnidirectional input image and output a rotational equivariant feature map from said omnidirectional image of a scene, said decoder network comprising an orientation decoder network and a position decoder network, said orientation decoder network being configured to determine the orientation of the image sensor and the position decoder network being configured to determine the position of the image sensor,
the processor being further configured to train said model using training data with a single image sensor orientation.

* * * * *